US011392006B2

(12) United States Patent
Lim et al.

(10) Patent No.: US 11,392,006 B2
(45) Date of Patent: Jul. 19, 2022

(54) TRANSMITTANCE-VARIABLE DEVICE

(71) Applicant: LG Chem, Ltd., Seoul (KR)

(72) Inventors: Eun Jung Lim, Daejeon (KR); Min Jun Gim, Daejeon (KR); Sergey Belyaev, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/269,158

(22) PCT Filed: Sep. 4, 2019

(86) PCT No.: PCT/KR2019/011381
§ 371 (c)(1),
(2) Date: Feb. 17, 2021

(87) PCT Pub. No.: WO2020/050613
PCT Pub. Date: Mar. 12, 2020

(65) Prior Publication Data
US 2021/0311342 A1 Oct. 7, 2021

(30) Foreign Application Priority Data

Sep. 4, 2018 (KR) .................... 10-2018-0105598
Sep. 4, 2018 (KR) .................... 10-2018-0105600

(51) Int. Cl.
*G02F 1/139* (2006.01)
*G02F 1/1337* (2006.01)
(Continued)

(52) U.S. Cl.
CPC ...... *G02F 1/1396* (2013.01); *G02F 1/133528* (2013.01); *G02F 1/133636* (2013.01); *G02F 1/133769* (2021.01); *G02F 2202/40* (2013.01)

(58) Field of Classification Search
CPC ............. G02F 1/1396; G02F 1/133769; G02F 1/133528; G02F 1/133636; G02F 2202/40
See application file for complete search history.

(56) References Cited

U.S. PATENT DOCUMENTS 5,519,523 A 5/1996 Madokoro et al.
5,943,104 A 8/1999 Moddel et al.
(Continued)

FOREIGN PATENT DOCUMENTS

JP H03230120 A 10/1991
JP 2695671 B2 1/1998
(Continued)

OTHER PUBLICATIONS

Search Report for European Application No. 19857312.3 dated Sep. 24, 2021. 2pgs.
(Continued)

*Primary Examiner* — Nathanael R Briggs
(74) *Attorney, Agent, or Firm* — Lerner, David, Littenberg, Krumholz & Mentlik, LLP

(57) ABSTRACT

A transmittance-variable device is disclosed herein. In some embodiments, the transmittance-variable device includes a retardation film, a liquid crystal alignment film, and a liquid crystal layer configured to implement a twist orientation mode, wherein the retardation film, the liquid crystal alignment film and the liquid crystal layer are sequentially arranged, wherein a twist angle (T) is in a range of 50 degrees to 180 degrees, and wherein the smallest angle A between a slow axis of the retardation film and an alignment direction of the liquid crystal alignment film satisfies Equation 1 when a product ($\Delta nd$) of a refractive index anisotropy ($\Delta n$) and a thickness (d) is 0.7 μm or less, and satisfies Equation 2 when the product ($\Delta nd$) is more than 0.7 μm. The transmittance-variable device can be applied to various applications without causing problems such as a crosstalk
(Continued)

phenomenon, a rainbow phenomenon or a mirroring phenomenon.

11 Claims, 14 Drawing Sheets

(51) Int. Cl.
    *G02F 1/1335*     (2006.01)
    *G02F 1/13363*     (2006.01)

(56) References Cited

U.S. PATENT DOCUMENTS

| | | |
|---|---|---|
| 2006/0203149 A1 | 9/2006 | Sato et al. |
| 2008/0180604 A1 | 7/2008 | Ohsawa et al. |
| 2020/0225393 A1 | 7/2020 | Lim et al. |

FOREIGN PATENT DOCUMENTS

| | | | |
|---|---|---|---|
| JP | 2743464 | B2 | 4/1998 |
| JP | 2005157082 | A * | 6/2005 |
| JP | 2005157082 | A | 6/2005 |
| JP | 2012208261 | A | 10/2012 |
| KR | 930010595 | A | 6/1993 |
| KR | 100254041 | B1 | 4/2000 |
| KR | 20060097640 | A | 9/2006 |
| KR | 20090027225 | A | 3/2009 |
| KR | 20180074594 | A | 7/2018 |
| TW | 200811489 | A | 3/2008 |
| TW | 200839377 | A | 10/2008 |
| TW | 201020613 | A | 6/2010 |

OTHER PUBLICATIONS

International Search Report for Application No. PCT/KR2019/011381, dated Dec. 13, 2019, 3 pages.

Taiwanese Search Report for Application No. 108131944, dated Feb. 17, 2021, 1 page.

Search Report dated Apr. 22, 2022 from the Office Action for Chinese Application No. 201980056566.7 dated Apr. 29, 2022, 3 pages.

* cited by examiner

TRANSMITTANCE-VARIABLE DEVICE

CROSS-REFERENCE TO RELATED APPLICATION(S)

The present application is a national phase entry under 35 U.S.C. § 371 of International Application No. PCT/KR2019/011381, filed on Sep. 4, 2019, which claims priority from Korean Patent Application Nos. 10-2018-0105598 and 10-2018-0105600, filed on Sep. 4, 2018, the disclosures of which are incorporated by reference herein.

TECHNICAL FIELD

The present application relates to a transmittance-variable device.

BACKGROUND ART

Devices that can vary transmittance with liquid crystal compounds and the like are known. For example, in Patent Document 1, a transmittance-variable device using a so-called GH cell (guest host cell) to which a liquid crystal host material and a dichroic dye guest are applied, is known.

The use of such devices has gradually expanded, and for example, the devices may be used in wearable devices such as eyewear of glasses or sunglasses, and the like, mobile devices, devices for virtual reality (VR) or augmented reality (AR) or windows of vehicles, or appliances that are applied outdoors.

In the case of a device for adjusting the transmittance by applying a liquid crystal compound, polarized light above a certain level is basically generated, where such a device causes problems such as a crosstalk phenomenon, a rainbow phenomenon or a mirroring phenomenon as the reflected light by road surfaces or structures, buildings, and the like has partially polarization characteristics depending on the use environments.

DISCLOSURE

Technical Problem

Figure 1:
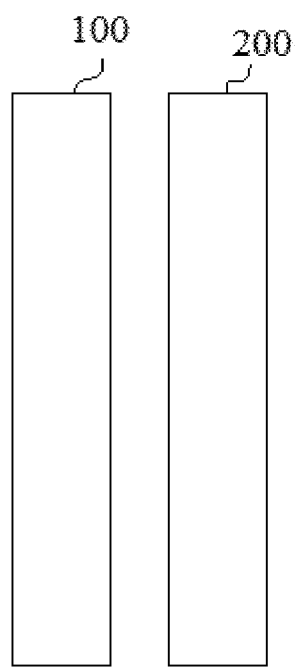
FIGS. 1 to 4 are schematic diagrams of exemplary transmittance-variable devices of the present application.

The present application relates to a transmittance-variable device. It is an object of the present application to provide a transmittance-variable device capable of being applied to various applications without causing problems such as a crosstalk phenomenon, a rainbow phenomenon or a mirroring phenomenon.

Technical Solution

The angle defined in this specification should be understood in consideration of an error such as a manufacturing error or a variation. For example, in this specification, the term vertical, parallel, orthogonal or horizontal, and the like may mean substantially vertical, parallel, orthogonal or horizontal in a range that does not impair the purpose and effect, and for example, in each case, it may include an error within about ±10 degrees, an error within about ±5 degrees, an error within about ±3 degrees, an error within about ±2 degrees, an error within about ±1 degree or an error within about ±0.5 degrees.

Among physical properties mentioned in this specification, when the measurement temperature affects the relevant physical property, the physical property is a physical property measured at room temperature, unless otherwise specified.

In this specification, the term room temperature is a temperature in a state that is not particularly warmed or decreased, which may mean any one temperature in a range of about 10° C. to 30° C., for example, a temperature of about 15° C. or more, 18° C. or more, 20° C. or more, or about 23° C. or more, and about 27° C. or less. In addition, unless otherwise specified, the unit of temperature referred to in this specification is ° C.

The phase difference, refractive index and refractive index anisotropy, and the like referred to in this specification are physical quantities with respect to light having a wavelength of about 550 nm, unless otherwise specified.

Unless otherwise specified, the angle formed by any two directions, which is mentioned herein, may be an acute angle of acute angles to obtuse angles formed by the two directions, or may be a smallest angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

In the present application, by applying a specific retardation film in a specific arrangement, it is possible to provide a transmittance-variable device which does not cause problems such as a crosstalk phenomenon, a rainbow phenomenon or a mirroring phenomenon.

In the present application, the term transmittance-variable device may mean a device capable of switching between at least two different light states. Here, the different light state may mean a state where at least the transmittance is different.

As examples of states that the transmittance-variable device may implement, transparent and black mode states may be exemplified. In one example, the transmittance-variable device of the present application may be a device capable of switching between at least the transparent and black mode states.

The transmittance of the transmittance-variable device in the transparent mode may be at least 20% or more, 25% or more, 30% or more, 35% or more, 40% or more, 45% or more, 50% or more, 55% or more, 60% or more, 65% or more, 70% or more, 75% or more, or 80% or more or so. Also, the transmittance of the transmittance-variable device in the black mode may be 60% or less, 55% or less, 50% or less, 45% or less, 40% or less, 35% or less, 30% or less, 25% or less, 20% or less, 15% or less, 10% or less, or 5% or less. Since the higher the transmittance in the transparent mode state is, the more advantageous it is and the lower the transmittance in the black mode state is, the more advantageous it is, the upper limit of the transmittance in the transparent mode state and the lower limit of the transmittance in the black mode state are not particularly limited, where in one example, the upper limit of the transmittance in the transparent mode state may be about 100% and the lower limit of the transmittance in the black mode state may be about 0%.

In one example, in the transmittance-variable device capable of switching between the transparent mode state and the black mode state, the difference between the transmittance in the transparent mode state and the transmittance in the black mode state (transparent mode—black mode) may be 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

In addition, in one example, the ratio (Tmax/Tmin) of the maximum transmittance (Tmax) in the transparent mode state to the minimum transmittance (Tmin) in the black mode state may be in a range of about 1.5 to 10. In another example, the ratio may be about 2 or more, 2.5 or more, 3 or more, 3.5 or more, 4 or more, 4.5 or more, 5 or more, 6 or more, or 6.5 or more, or may be about 9.5 or less, about 9 or less, about 8.5 or less, about 8 or less, about 7.5 or less, about 7 or less, about 6.5 or less, about 6 or less, about 5.5 or less, about 5 or less, about 4.5 or less, about 4 or less, about 3.5 or less, about 3 or less, about 2.5 or less, or about 2 or less.

The transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The transmittance or reflectance may be each transmittance or reflectance for any one wavelength in the visible light region, for example, any one wavelength in a range of about 400 to 700 nm or about 380 to 780 nm, or transmittance or reflectance for the entire visible light region, maximum or minimum transmittance or reflectance among the transmittance or reflectance for the entire visible light region, or an average value of the transmittance or an average value of the reflectance in the visible region. In another example, the transmittance may be transmittance for light having a wavelength of about 550 nm.

The transmittance-variable device of the present application may be designed to switch between at least two or more states of any one state selected from the transparent and black mode states. If necessary, other states other than the above states, for example, other third states or further states including an intermediate transmittance state in the transparent mode and black mode states can also be implemented.

The switching of the transmittance-variable device may be controlled depending on whether or not an external signal, for example, a voltage signal is applied. For example, in a state of not applying an external signal such as a voltage, the transmittance-variable device may maintain any one of the above-described states, and then may be switched to another state when a voltage is applied. The state of the mode may be changed or the third different mode state may also be implemented, by changing the intensity, frequency and/or shape of the applied voltage.

The transmittance-variable device of the present application may comprise at least a transmittance-variable layer for the above switching. In one example, the transmittance-variable layer may be a layer that generates a polarization component. An example of such a transmittance-variable layer includes an active liquid crystal layer.

In the present application, the term active liquid crystal layer is a layer containing at least a liquid crystal compound, which may mean a liquid crystal layer capable of controlling the oriented state of the liquid crystal compound through external signal application or the like. However, the application of the active liquid crystal layer is one example of the present application, and if necessary, other known transmittance-variable layers, for example, an electrochromic material layer, a photochromic material layer, an electrophoretic material layer or a dispersed particle alignment layer, etc. may also be used.

The active liquid crystal layer is a layer containing a liquid crystal compound. In this specification, all layers containing a liquid crystal compound capable of controlling its orientation through application of an external signal, or the like are included in the range of the term active liquid crystal layer, and for example, as described below, a so-called guest host layer comprising a liquid crystal compound (liquid crystal host) and a dichroic dye is also a kind of liquid crystal layer defined in this specification. As the liquid crystal compound, any kind of liquid crystal compound can be used as long as its orientation direction can be changed by application of an external signal. For example, a smectic liquid crystal compound, a nematic liquid crystal compound or a cholesteric liquid crystal compound may be used as the liquid crystal compound. In addition, the liquid crystal compound may be, for example, a compound having no polymerizable group or crosslinkable group so that the orientation direction thereof may be changed by application of an external signal.

The liquid crystal layer may comprise a liquid crystal compound whose dielectric constant anisotropy is positive or negative, or the liquid crystal layer may exhibit the dielectric constant anisotropy mentioned above. The absolute value of the dielectric constant anisotropy can be appropriately selected in consideration of the object of the present application. The term "dielectric constant anisotropy ($\Delta \varepsilon$)" may mean a difference ($\varepsilon // - \varepsilon \perp$) between the horizontal dielectric constant ($\varepsilon //$) and the vertical dielectric constant ($\varepsilon \perp$). In this specification, the term horizontal dielectric constant ($\varepsilon //$) means a dielectric constant value measured along the direction of an electric field in a state where a voltage is applied so that the director of the liquid crystal and the direction of the electric field by the applied voltage are substantially horizontal, and the vertical dielectric constant ($\varepsilon \perp$) means a dielectric constant value measured along the direction of an electric field in a state where a voltage is applied so that the director of the liquid crystal and the direction of the electric field by the applied voltage are substantially perpendicular.

The liquid crystal layer may comprise a liquid crystal compound having refractive index anisotropy ($\Delta n$) in a range of about 0.03 to 0.2, or the liquid crystal layer may exhibit the aforementioned refractive index anisotropy. The refractive index anisotropy ($\Delta n$) referred to in the present application is a difference (ne−no) between an extraordinary refractive index (ne) and an ordinary refractive index (no), which can be confirmed using an Abbe refractometer, and the specific manner is in accordance with the method disclosed in the following examples.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode, or the like.

The active liquid crystal layer, which is a transmittance-variable layer, may further comprise a dichroic dye together with the liquid crystal compound in terms of controlling light transmittance-variable characteristics. In this case, the active liquid crystal layer may be referred to as a guest host liquid crystal cell described below. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, the transmittance-variable layer is a liquid crystal layer comprising liquid crystal and dichroic dyes, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

The ratio of the dichroic dye included in the guest host liquid crystal layer is not particularly limited, which may be set in an appropriate range in consideration of the desired transmittance. In general, the dichroic dye may be included in the liquid crystal layer at a ratio of about 0.1 weight % to 4 weight % in consideration of miscibility of the dichroic dye and the liquid crystal compound.

The light modulation film layer comprising the guest host liquid crystal layer as the transmittance-variable layer may function as an active polarizer. In this specification, the term "active polarizer" may mean a functional element capable of controlling anisotropic light absorption depending on external signal application. Such an active polarizer can be distinguished from a passive polarizer, which is described below, having constant light absorption or light reflection characteristics regardless of the external signal application. The guest host liquid crystal layer can control the anisotropic light absorption for the polarized light in the direction parallel to the arrangement direction of dichroic dyes and the polarized light in the vertical direction by controlling the arrangement of liquid crystals and dichroic dyes. Since the arrangement of liquid crystals and dichroic dyes can be controlled by the application of the external signal such as a magnetic field or an electric field, the guest host liquid crystal layer can control anisotropic light absorption depending on the external signal application.

In one example, the active liquid crystal layer may be configured to be capable of switching at least between any one state of a vertical orientation mode, a horizontal orientation mode and an oblique orientation mode and another state. The meanings of the vertical, horizontal and oblique orientation modes are in accordance with the known content.

Thus, for example, the term horizontal orientation state may mean a state where directors of an active liquid crystal layer, which is a transmittance-variable layer, or directors of a liquid crystal compound in the liquid crystal layer are arranged substantially parallel to the variable layer (liquid crystal layer). In this case, the angle that the directors and the variable layer form on the side of the variable layer (liquid crystal layer) may be in a range of approximately 0 degrees to 10 degrees or approximately 0 degrees to 5 degrees, or about 0 degrees.

Furthermore, for example, the term vertical alignment state may be a state where directors of an active liquid crystal layer, which is a transmittance-variable layer, or directors of a liquid crystal compound in the liquid crystal layer are arranged substantially perpendicular to the plane of the variable layer (liquid crystal layer), and for example, the angle that the directors and the variable layer (liquid crystal layer) form on the side of the variable layer (liquid crystal layer) may be in a range of about 80 degrees to 100 degrees or 85 degrees to 95 degrees, or approximately 90 degrees.

In addition, for example, the term oblique orientation state is an orientation state of an intermediate state between the vertical orientation state and the horizontal orientation state, which may mean a case where the angle that the directors of the variable layer (liquid crystal layer) or the directors of the liquid crystal compound in the liquid crystal layer form with the variable layer (liquid crystal layer) on the side of the variable layer (liquid crystal layer) is greater than 0 degrees and less than 90 degrees, or a case where it is in a range of approximately 10 degrees to 80 degrees.

In this specification, the director of the liquid crystal molecule or the liquid crystal compound may mean a light axis (optical axis) or a slow axis of the active liquid crystal layer. The director of the liquid crystal molecule may mean the long axis direction when the liquid crystal molecule has a rod shape and may mean a normal direction axis of the disk plane when the liquid crystal molecule has a discotic shape. When there is a plurality of liquid crystal compounds having different directors in the active liquid crystal layer, the director is a vector sum.

In one example, the active liquid crystal layer, which is the transmittance-variable layer, may be designed to implement at least a twist orientation mode. The term twist orientation mode may mean a helical structure in which the directors of the liquid crystal compounds are twisted along an imaginary helical axis in the liquid crystal layer and simultaneously oriented to form a layer. The twist orientation mode may be implemented in the above-described vertical, horizontal or oblique orientation mode, and that is, the vertical twist orientation mode is a layered state in which the individual liquid crystal compounds are twisted along the helical axis in a vertically oriented state and the horizontal twist orientation mode is a layered state in which the individual liquid crystal compounds are twisted along the helical axis in a horizontally oriented state, and the oblique twist orientation mode is a layered state in which the individual liquid crystal compounds are twisted along the helical axis in an obliquely oriented state.

In the twist orientation mode, the ratio (d/p) of the thickness (d) and the pitch (p) of the liquid crystal layer may be 1 or less. When the ratio (d/p) is greater than 1, there may be a problem that a finger domain or the like occurs, and thus it may be adjusted to the above range, if possible. The lower limit of the ratio (d/p) is not particularly limited, but may be about 0.6 or more or more than about 0.6. Here, the thickness (d) of the liquid crystal layer may be the same meaning as the cell gap of the liquid crystal cell.

The pitch (p) of the liquid crystal layer in the twist orientation mode may be measured by a measuring method using a wedge cell, and specifically, it may be measured by a method described in Simple method for accurate measurement of the cholesteric pitch using a "stripe-wedge Grandjean-Cano cell of D. Podolskyy, et al. (Liquid Crystals, Vol. 35, No. 7, July 2008, 789-791).

The liquid crystal layer may further comprise a so-called chiral agent so that the liquid crystal layer may implement a twist mode. That is, the active liquid crystal layer may comprise at least a liquid crystal compound and a chiral agent, or may comprise at least a liquid crystal compound, a dichroic dye and a chiral agent. The chiral agent (or chiral dopant) that can be included in the liquid crystal layer can be used without particular limitation as long as it can induce a desired rotation (twisting) without deteriorating the liquid crystallinity, for example, the nematic regularity. The chiral agent for inducing rotation in the liquid crystal molecules needs to include at least chirality in the molecular structure. The chiral agent may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral agent may be, for example, a low molecular weight compound having a molecular weight of 1,500 or less. As the chiral agent, commercially available chiral nematic liquid crystals, for example, chiral dopant liquid crystal S-811 available from Merck Co., Ltd. or LC756 available from BASF may also be used.

The application ratio of the chiral agent is selected so as to achieve the desired ratio (d/p), which is not particularly limited. In general, the content (weight %) of the chiral agent is calculated by an equation of 100/HTP (helical twisting power)×pitch (nm), and an appropriate ratio can be selected in consideration of the desired pitch with reference to this method.

The thicknesses of the transmittance-variable layer may each be appropriately selected in consideration of the object of the present application. In one example, the thickness of the transmittance-variable layer may be about 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. By controlling the thickness in this way, a device having a large difference in transmittance according to the mode state can be realized. The thicker the thickness, the higher the difference in transmittance and/or reflectance can be realized, and thus it is not particularly limited, but may be generally about 30 μm or less, 25 μm or less, 20 μm or less, or 15 μm or less.

The device of the present application further comprises a retardation film disposed on at least one side of the above-mentioned transmittance-variable layer. FIG. 1 is a schematic diagram of a device according to one example of the present application, and shows the retardation film (100) and the variable layer (200) sequentially arranged.

By arranging a film having optically large anisotropy at a specific position as the retardation film, the present application can provide a device without a so-called rainbow phenomenon, or mirroring phenomenon and crosstalk phenomenon. Incidentally, by applying an anisotropic film in terms of mechanical properties as the retardation film, a device having excellent mechanical properties can also be constituted.

In this specification, the retardation film that is anisotropic in terms of optical and mechanical properties may be referred to as an asymmetric substrate or an asymmetric retardation film. Here, the fact that the retardation film is optically anisotropic is a case of having in-plane retardation to be described below, and the fact that it is anisotropic in terms of mechanical properties is a case of having physical properties to be described below.

Hereinafter, physical properties of the retardation film mentioned herein may be physical properties of the retardation film itself, or physical properties in a state where an electrode layer is formed on one side of the retardation film. In this case, the electrode layer may be an electrode layer formed in a state where the retardation film is included in the optical device.

Measurement of physical properties of each retardation film mentioned herein is performed according to the method described in the example section of this specification.

In one example, the in-plane retardation of the retardation film may be about 4,000 nm or more. The in-plane retardation is a value for light having a wavelength of 550 nm.

In this specification, the in-plane retardation (Rin) may mean a value calculated by Equation A below.

$$Rin = d \times (nx - ny) \quad \text{[Equation A]}$$

In Equation A, Rin is in-plane retardation, d is a thickness of the retardation film, nx is a refractive index in the in-plane slow axis direction of the retardation film, ny is a refractive index in the fast axis direction, which is the refractive index of the in-plane direction perpendicular to the slow axis direction.

The in-plane retardation of the retardation film may each be 4,500 nm or more, 5,000 nm or more, 6,000 nm or more, 7,000 nm or more, 8,000 nm or more, 9,000 nm or more, 10,000 nm or more, 11,000 nm or more, 12,000 nm or more, 13,000 nm or more, 14,000 nm or more, or 15,000 nm or more or so. The in-plane retardation of the retardation film may each be about 50,000 nm or less, about 40,000 nm or less, about 30,000 nm or less, 20,000 nm or less, 18,000 nm or less, 16,000 nm or less, 15,000 nm or less, or 12,000 nm or less or so.

As a film having large retardation as above, a film known as a so-called high-stretched PET (poly(ethylene terephthalate)) film or SRF (super retardation film), and the like is typically known. Therefore, in the present application, the retardation film may be, for example, a polyester film.

The film having extremely high retardation as above is known in the art, and such a film exhibits high asymmetry even in mechanical properties by high stretching or the like during preparation procedures as well as optically large anisotropy. A representative example of the retardation film in a state known in the art is a polyester film such as a PET (poly(ethylene terephthalate)) film, and for example, there are films of the trade name SRF (super retardation film) series supplied by Toyobo Co., Ltd.

In one example, in the retardation films, a ratio (E1/E2) of an elongation (E1) in any first direction in the plane to an elongation (E2) in a second direction perpendicular to the first direction may be 3 or more. In another example, the ratio (E1/E2) may be about 3.5 or more, 4 or more, 4.5 or more, 5 or more, 5.5 or more, 6 or more, or 6.5 or more. In another example, the ratio (E1/E2) may be about 20 or less, 18 or less, 16 or less, 14 or less, 12 or less, 10 or less, 8 or less, or 7.5 or less.

In this specification, the terms "first direction," "second direction" and "third direction" of the retardation film are each any in-plane direction of the film. For example, when the retardation film is a stretched retardation film, the in-plane direction may be an in-plane direction formed by MD (machine direction) and TD (transverse direction) directions of the retardation film. In one example, the first direction described herein may be any one of the slow axis direction and the fast axis direction of the retardation film, and the second direction may be the other of the slow axis direction and the fast axis direction. In another example, when the retardation film is a stretched retardation film, the first direction may be any one of MD (machine direction) and TD (transverse direction) directions, and the second direction may be the other of MD (machine direction) and TD (transverse direction) directions.

In one example, the first direction of the retardation film mentioned herein may be the TD direction or the slow axis direction.

The retardation film may have the elongation in the first direction (for example, the above-described slow axis direction or TD direction) of 15% or more, or 20% or more. In another example, the elongation may be about 25% or more, 30% or more, 35% or more, or 40% or more, or may be about 60% or less, 55% or less, 50% or less, or 45% or less.

In one example, in the retardation film, an elongation (E3) in a third direction forming an angle within a range of 40 degrees to 50 degrees or about 45 degrees with the first and second directions, respectively, is larger than the elongation (E1) in the first direction, where the ratio (E3/E2) of the elongation (E3) in the third direction to the elongation (E2) in the second direction may be 5 or more.

In another example, the ratio (E3/E2) may be 5.5 or more, 6 or more, 6.5 or more, 7 or more, 7.5 or more, 8 or more, or 8.5 or more, and may be about 20 or less, 18 or less, 16 or less, 14 or less, 12 or less, or 10 or less.

The retardation film may have the elongation in the third direction of 30% or more. In another example, the elongation may be about 35% or more, 40% or more, 45% or more, 50% or more, or 55% or more, or may be about 80% or less, 75% or less, 70% or less, or 65% or less.

In the retardation film, a ratio (CTE2/CTE1) of a coefficient of thermal expansion (CTE2) in the second direction to a coefficient of thermal expansion (CTE1) in the first direction may be 1.5 or more. The coefficients of thermal expansion (CTE1, CTE2) are each a value confirmed within a temperature range of 40° C. to 80° C. In another example, the ratio (CTE2/CTE1) may be about 2 or more, about 2.5 or more, 3 or more, or 3.5 or more, or may be 10 or less, 9 or less, 8 or less, 7 or less, 6 or less, 5 or less, or 4 or less.

The coefficient of thermal expansion (CTE2) in the second direction may be in a range of 5 to 150 ppm/° C. The coefficient of thermal expansion may be about 10 ppm/° C. or more, 15 ppm/° C. or more, 20 ppm/° C. or more, 25 ppm/° C. or more, 30 ppm/° C. or more, 35 ppm/° C. or more, 40 ppm/° C. or more, 45 ppm/° C. or more, 50 ppm/° C. or more, 55 ppm/° C. or more, 60 ppm/° C. or more, 65 ppm/° C. or more, 70 ppm/° C. or more, 75 ppm/° C. or more, or 80 ppm/° C. or more, or may be 140 ppm/° C. or less, 130 ppm/° C. or less, 120 ppm/° C. or less, 100 ppm/° C. or less, 95 ppm/° C. or less, 90 ppm/° C. or less, 85 ppm/° C. or less, 80 ppm/° C. or less, 40 ppm/° C. or less, 30 ppm/° C. or less, or 25 ppm/° C. or less.

In the retardation film, a ratio (YM1/YM2) of an elastic modulus (YM1) in the first direction to an elastic modulus (YM2) in the second direction may be 1.5 or more. In another example, the ratio (YM1/YM2) may be about 2 or more, or may be 10 or less, 9 or less, 8 or less, 7 or less, 6 or less, 5 or less, 4 or less, 3 or less or 2.5 or less.

The elastic modulus (YM1) in the first direction may be in a range of about 2 to 10 GPa. In another example, the elastic modulus (YM1) may be about 2.5 GPa or more, 3 GPa or more, 3.5 GPa or more, 4 GPa or more, 4.5 GPa or more, 5 GPa or more, or 5.5 GPa or more, or may also be about 9.5 GPa or less, 9 GPa or less, 8.5 GPa or less, 8 GPa or less, 7.5 GPa or less, 7 GPa or less, 6.5 GPa or less, or 6 GPa or less.

The elastic modulus may mean a so-called Young's modulus.

In the retardation film, a ratio (MS1/MS2) of a maximum stress (MS1) in the first direction to a maximum stress (MS2) in the second direction may be 1.5 or more. In another example, the ratio (MS1/MS2) may be about 2 or more, or may be 10 or less, 9 or less, 8 or less, 7 or less, 6 or less, 5 or less, 4 or less, 3 or less, or 2.5 or less.

The maximum stress (MS1) in the first direction (for example, the above-described slow axis direction or TD direction) may be in a range of about 80 to 300 MPa. In another example, the maximum stress (MS1) may be about 90 MPa or more, about 100 MPa or more, about 110 MPa or more, about 120 MPa or more, about 130 MPa or more, about 140 MPa or more, about 150 MPa or more, about 155 MPa or more, 160 MPa or more, 165 MPa or more, 170 MPa or more, 175 MPa or more, or 180 MPa or more, or may also be about 300 MPa or less, about 290 MPa or less, about 280 MPa or less, about 270 MPa or less, about 260 MPa or less, about 250 MPa or less, about 245 MPa or less, 240 MPa or less, 235 MPa or less, 230 MPa or less, 225 MPa or less, 220 MPa or less, 215 MPa or less, 210 MPa or less, 205 MPa or less, 200 MPa or less, 195 MPa or less, or 190 MPa or less.

As described above, a representative example of the polymer film having large optical and mechanical asymmetry as above is a stretched PET (polyethyleneterephthalate) film known as a so-called high stretched polyester film or the like, and such a film is easily available in the industry.

Usually, the stretched PET film is a uniaxially stretched film of one or more layers produced by forming a PET-based resin into a film with melting/extruding, and stretching it or a biaxially stretched film of one or more layers produced by longitudinally and transversely stretching it after film formation.

The PET-based resin generally means a resin in which 80 mol % or more of the repeating units are ethylene terephthalate, which may also contain other dicarboxylic acid components and diol components. Other dicarboxylic acid components are not particularly limited, but may include, for example, isophthalic acid, p-beta-oxyethoxybenzoic acid, 4,4'-dicarboxydiphenyl, 4,4'-dicarboxybenzophenone, bis (4-carboxyphenyl)ethane, adipic acid, sebacic acid and/or 1,4-dicarboxycyclohexane, and the like.

Other diol components are not particularly limited, but may include propylene glycol, butanediol, neopentyl glycol, diethylene glycol, cyclohexanediol, ethylene oxide adducts of bisphenol A, polyethylene glycol, polypropylene glycol and/or polytetramethylene glycol, and the like.

The dicarboxylic acid component or the diol component may be used in combination of two or more as necessary. Furthermore, an oxycarboxylic acid such as p-oxybenzoic acid may also be used in combination. In addition, as other copolymerization components, a dicarboxylic acid component containing a small amount of amide bonds, urethane bonds, ether bonds and carbonate bonds, and the like, or a diol component may also be used.

As a production method of the PET-based resin, a method of directly polycondensing terephthalic acid, ethylene glycol and/or, as necessary, other dicarboxylic acids or other diols, a method of transesterifying dialkyl ester of terephthalic acid and ethylene glycol and/or, as necessary, dialkyl esters of other dicarboxylic acids or other diols and then polycondensing them, and a method of polycondensing terephtalic acid and/or, as necessary, ethylene glycol esters of other dicarboxylic acids and/or, as necessary, other diolesters, and the like are adopted.

For each polymerization reaction, a polymerization catalyst containing an antimony-based, titanium-based, germanium-based or aluminum-based compound, or a polymerization catalyst containing the composite compound can be used.

The polymerization reaction conditions can be appropriately selected depending on monomers, catalysts, reaction apparatuses and intended resin physical properties, and are not particularly limited, but for example, the reaction temperature is usually about 150° C. to about 300° C., about 200° C. to about 300° C. or about 260° C. to about 300° C. Furthermore, the reaction pressure is usually atmospheric pressure to about 2.7 Pa, where the pressure may be reduced in the latter half of the reaction.

The polymerization reaction proceeds by volatilizing leaving reactants such as a diol, an alkyl compound or water.

The polymerization apparatus may also be one which is completed by one reaction tank or connects a plurality of reaction tanks. In this case, the reactants are polymerized while being transferred between the reaction tanks, depending on the degree of polymerization. In addition, a method, in which a horizontal reaction apparatus is provided in the latter half of the polymerization and the reactants are volatilized while heating/kneading, may also be adopted.

After completion of the polymerization, the resin is discharged from the reaction tank or the horizontal reaction apparatus in a molten state, and then, obtained in the form of flakes cooled and pulverized in a cooling drum or a cooling belt, or in the form of pellets tailored after being introduced into an extruder and extruded in a string shape. Furthermore, solid-phase polymerization may be performed as needed, thereby improving the molecular weight or decreasing the low molecular weight component. As the low molecular weight component that may be contained in the PET-based resin, a cyclic trimer component may be exemplified, but the content of such a cyclic trimer component in the resin is usually controlled to 5,000 ppm or less, or 3,000 ppm or less.

The molecular weight of the PET-based resin is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C.

In addition, the PET-based resin may contain additives as required. The additive may include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin is used in the form of pellets assembled by an ordinary extruder, for formulation of such additives and film molding to be described below. The size and shape of the pellets are not particularly limited, but they are generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method is adopted.

Pellets made of the dried PET resin are supplied to a melt extrusion apparatus, heated to a melting point or higher and melted. Next, the melted resin is extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but is usually 250° C. to 350° C. In order to improve planarity of the film, it is also preferred to enhance adhesion between the film and the rotary cooling drum, and an adhesion method by electrostatic application or an adhesion method by liquid coating is preferably adopted. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of them may also be used in combination if necessary. The PET-based resin to be used may be mixed with two or more resins, or resins having different structures or compositions, if necessary. For example, it may include using a mixture of pellets blended with a particulate filling material as an anti-blocking agent, an ultraviolet absorbing agent or an antistatic agent, and the like, and non-blended pellets, and the like.

Furthermore, the laminating number of films to be extruded may also be two or more layers, if necessary. For example, it may include that pellets blended with a particulate filling material as an anti-blocking agent and non-blended pellets are prepared and supplied from the other extruder to the same die to extrude a film composed of two kinds and three layers, "blended with filling material/non-blended/blended with filling material," and the like.

The un-stretched film is usually stretched longitudinally at a temperature not lower than the glass transition temperature in the extrusion direction first. The stretching temperature is usually 70 to 150° C., 80 to 130° C., or 90 to 120° C. In addition, the stretching ratio is usually 1.1 to 6 times or 2 to 5.5 times. The stretching may be terminated once or divided into more than once as necessary.

The longitudinally stretched film thus obtained may be subjected to a heat treatment thereafter. Then, a relaxation treatment may be performed if necessary. The heat treatment temperature is usually 150 to 250° C., 180 to 245° C. or 200 to 230° C. Also, the heat treatment time is usually 1 to 600 seconds or 1 to 300 seconds or 1 to 60 seconds.

The temperature of the relaxation treatment is usually 90 to 200° C. or 120 to 180° C. Also, the amount of relaxation is usually 0.1 to 20% or 2 to 5%. The relaxation treatment temperature and the relaxation amount can be set so that a heat shrinkage rate of the PET film after relaxation treatment at 150° C. is 2% or less.

In the case of obtaining uniaxially stretched and biaxially stretched films, transverse stretching is usually performed by a tenter after the longitudinal stretching treatment or after the heat treatment or relaxation treatment, if necessary. The stretching temperature is usually 70 to 150° C., 80 to 130° C., or 90 to 120° C. In addition, the stretching ratio is usually 1.1 to 6 times or 2 to 5.5 times. Thereafter, the heat treatment and, if necessary, the relaxation treatment can be performed. The heat treatment temperature is usually 150 to 250° C. or 180 to 245° C. or 200 to 230° C. The heat treatment time is usually 1 to 600 seconds, 1 to 300 seconds, or 1 to 60 seconds.

The temperature of the relaxation treatment is usually 100 to 230° C., 110 to 210° C. or 120 to 180° C. Also, the relaxation amount is usually 0.1 to 20%, 1 to 10%, or 2 to 5%. The relaxation treatment temperature and the relaxation amount can be set so that the heat shrinkage rate of the PET film after the relaxation treatment at 150° C. is 2% or less.

In uniaxial stretching and biaxial stretching treatments, after the transverse stretching, in order to alleviate deformation of the orientation main axis as represented by bowing, the heat treatment can be performed again or the stretching treatment can be performed after the transverse stretching. The maximum value of deformation in the orientation main axis by bowing with respect to the stretching direction is usually within 45 degrees, within 30 degrees, or within 15 degrees. Here, the stretching direction also refers to a stretching large direction in longitudinal stretching or transverse stretching.

In the biaxial stretching of the PET film, the transverse stretching ratio is usually slightly larger than the longitudinal stretching ratio, where the stretching direction refers to a direction perpendicular to the long direction of the film. Also, the uniaxial stretching is usually stretched in the transverse direction as described above, where the stretching direction equally refers to a direction perpendicular to the long direction.

Also, the orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction.

The direction of identifying the orientation main axis is known, and for example, it can be measured using a retardation film/optical material inspection apparatus RETS (manufactured by Otsuka Densi KK) or a molecular orientation system MOA (manufactured by Oji Scientific Instruments).

The functional layer other than the antiglare layer or the like can be laminated on one side or both sides of the stretched PET film, unless it interferes with the effect of the present application. The functional layer to be laminated may include, for example, a conductive layer, a hard coating layer, a smoothing layer, an easily slipping layer, an anti-blocking layer and an easy adhesion layer, and the like.

The above-described production method is one exemplary method for obtaining the retardation film of the present application, where as long as the retardation film applicable in the present application has the above-described physical properties, any kind of commercially available product can also be used.

In the device of the present application, the retardation film is included in the device so that the slow axis of the film has a specific positional relationship.

Figure 2:
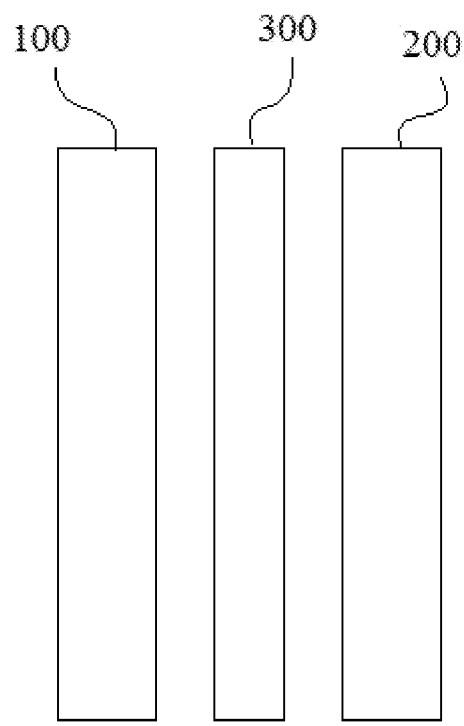

In one example, the device may comprise a liquid crystal alignment film, which is described below, between the retardation film and the transmittance-variable layer, where the angle formed between the slow axis of the retardation film and the alignment direction of the liquid crystal alignment film may be in a range of 0 degrees to 70 degrees. FIG. 2 is a schematic diagram of a case where the retardation film (100), the liquid crystal alignment film (300), and the transmittance-variable layer (200) are arrange sequentially in the illustration. The angle is a smallest angle among the angles formed by the alignment direction and the slow axis, and in one example, it may be in a range of 0 degrees to 360 degrees or so. In another example, the angle may be more than 0 degrees, 2 degrees or more, 4 degrees or more, 6 degrees or more, 8 degrees or more, 10 degrees or more, 12 degrees or more, 14 degrees or more, 16 degrees or more, 18 degrees or more, 20 degrees or more, 22 degrees or more, 24 degrees or more, 26 degrees or more, 28 degrees or more, 30 degrees or more, 32 degrees or more, 34 degrees or more, 36 degrees or more, 38 degrees or more, 40 degrees or more, 42 degrees or more, 44 degrees or more, 46 degrees or more, 48 degrees or more, or 50 degrees or more, or may also be less than 360 degrees, 350 degrees or less, 340 degrees or less, 330 degrees or less, 320 degrees or less, 310 degrees or less, 300 degrees or less, 290 degrees or less, 280 degrees or less, 270 degrees or less, 260 degrees or less, 250 degrees or less, 240 degrees or less, 230 degrees or less, 220 degrees or less, 210 degrees or less, 200 degrees or less, 190 degrees or less, 180 degrees or less, 170 degrees or less, 160 degrees or less, 150 degrees or less, 140 degrees or less, 130 degrees or less, 120 degrees or less, 110 degrees or less, 100 degrees or less, 90 degrees or less, 80 degrees or less, 70 degrees or less, or 60 degrees or less or so. The liquid crystal alignment film may be used to determine the initial orientation of the liquid crystals in the liquid crystal layer when the transmittance-variable layer is an active liquid crystal layer. The kind of liquid crystal alignment film applied at this time is not particularly limited, which may be, for example, a known rubbing alignment film or photo-alignment film. As described below, the alignment film may exist on both sides of the active liquid crystal layer, and in this case, the alignment film having the alignment direction of the angle with the slow axis of the retardation film is an alignment direction of the alignment film located close to the retardation film. The alignment direction may be the rubbing direction in the case of the rubbing alignment film and the direction of polarized light to be irradiated in the case of the photo-alignment film, where such an alignment direction may be confirmed by a detection method using a linear polarizer. For example, in the case of being the liquid crystal layer (transmittance-variable layer) in a twist orientation mode such as an STN (super twisted nematic) mode, upon disposing a linear polarizer on one side and measuring the transmittance while changing the absorption axis of the polarizer, the transmittance tends to be low when the alignment direction of the liquid crystal alignment film coincides with the absorption axis or the transmission axis, where the alignment direction can be confirmed through simulation reflecting refractive index anisotropy of the applied liquid crystal compound and the like. The method of confirming an alignment direction according to the mode of the liquid crystal layer (transmittance-variable layer) is known, and in the present application, the angle formed by the alignment direction of the liquid crystal alignment film and the slow axis can be confirmed by such a known method.

In another example, in the case where the transmittance-variable layer is an active liquid crystal layer capable of implementing the above-described twist orientation mode, upon measuring the angle between the slow axis of the retardation film and the alignment direction of the liquid crystal alignment film along the twisting direction of the twist orientation mode in the alignment direction of the liquid crystal alignment film, the retardation film may be disposed so that it is in the range of 0 degrees to 70 degrees. In another example, the angle may be more than 0 degrees, 2 degrees or more, 4 degrees or more, 6 degrees or more, 8 degrees or more, 10 degrees or more, 12 degrees or more, 14 degrees or more, 15 degrees or more, or 16 degrees or more, or may also be 65 degrees or less, or 60 degrees or less or so. Here, the meaning of the alignment direction of the liquid crystal alignment film and a method of determining the same are as described above, and the twisting direction in the liquid crystal layer of the twist mode may be measured through rotation direction analyses of the polarized light source emitted from the transmittance-variable layer using a measuring instrument such as Exoscan. In such a case, the twisting direction may be clockwise or counterclockwise.

In another example, the arrangement of the retardation film may also be controlled in consideration of the twisting angle of the twist orientation mode, the refractive index anisotropy of the transmittance-variable layer (active liquid crystal layer) and/or the thickness of the variable layer (active liquid crystal layer).

For example, when the twist angle in the twist orientation mode of the variable layer is in a range of 50 degrees to 180 degrees or 80 degrees to 180 degrees, the smallest angle among the angles between the slow axis of the retardation film and the alignment direction of the liquid crystal alignment film, or the angle between the slow axis and the alignment direction measured along the twisting direction of the twist orientation mode in the alignment direction of the liquid crystal alignment film may satisfy Equation 1 below.

$$0.05 \times \Delta n d \times T/\mu m + 10 \leq A \leq 0.16 \times \Delta n d \times T/\mu m + 60 \quad [\text{Equation 1}]$$

In Equation 1, A is the smallest angle among the angles formed by the alignment direction of the liquid crystal alignment film or the angle between the slow axis and the alignment direction measured along the twisting direction of the twist orientation mode in the alignment direction of the liquid crystal alignment film (unit: degree), $\Delta n$ is the refractive index anisotropy of the variable layer (active liquid crystal layer) for light having a wavelength of 550 nm, d is the thickness (unit: μm) of the liquid crystal layer, and T is the twist angle (unit: degree) of the twist orientation mode.

The method of confirming the twisting direction of the twist orientation mode for confirming whether or not the equation is satisfied is as described above, and the twist angle can be calculated back or estimated by way of polarized light analyses reflecting the refractive index anisotropy of the liquid crystal compound and the cell gap through a known measurement method such as Exoscan, or after checking the pitch of the liquid crystal layer using Wedge Cell, it can be estimated through the pitch value relative to the cell gap.

When Equation 1 above is satisfied, the product ($\Delta n d$) of the refractive index anisotropy ($\Delta n$) of the liquid crystal layer for light having a wavelength of 550 nm and the thickness (d) of the liquid crystal layer may be 0.7 μm or less. In another example, the product ($\Delta n d$) of the refractive index anisotropy ($\Delta n$) and the thickness (d) of the liquid crystal layer may be about 0.2 μm or more, 0.25 μm or more, 0.3 μm or more, 0.35 μm or more, 0.4 μm or more, or 0.45 μm or more.

Also, in another example, the angle A in Equation 1 above may be ($0.05 \times \Delta n d \times T/\mu m + 11$) or more, ($0.05 \times \Delta n d \times T/\mu m + 12$) or more, ($0.05 \times \Delta n d \times T/\mu m + 13$) or more, ($0.05 \times \Delta n d \times T/\mu m + 14$) or more, ($0.05 \times \Delta n d \times T/\mu m + 15$) or more, ($0.05 \times \Delta n d \times T/\mu m + 16$) or more, ($0.05 \times \Delta n d \times T/\mu m + 17$) or more, ($0.05 \times \Delta n d \times T/\mu m + 18$) or more, ($0.05 \times \Delta n d \times T/\mu m + 19$) or more, ($0.05 \times \Delta n d \times T/\mu m + 20$)) or more, or ($0.05 \times \Delta n d \times T/\mu m + 21$) or more.

The angle A in Equation 1 above may also be ($0.16 \times \Delta n d \times T/\mu m + 55$) or less, ($0.16 \times \Delta n d \times T/\mu m + 50$) or less, ($0.16 \times \Delta n d \times T/\mu m + 45$) or less, ($0.16 \times \Delta n d \times T/\mu m + 40$) or less, ($0.16 \times \Delta n d \times T/\mu m + 35$) or less, ($0.16 \times \Delta n d \times T/\mu m + 30$) or less, ($0.16 \times \Delta n d \times T/\mu m + 25$) or less, ($0.16 \times \Delta n d \times T/\mu m + 20$) or less, ($0.16 \times \Delta n d \times T/\mu m + 15$) or less, ($0.16 \times \Delta n d \times T/\mu m + 10$) or less, ($0.16 \times \Delta n d \times T/\mu m + 5$) or less, or ($0.16 \times \Delta n d \times T/\mu m + 1$) or less or so.

In another example, when the twist angle in the twist orientation mode of the variable layer is in a range of 50 degrees to 180 degrees or 80 degrees to 180 degrees, the smallest angle among the angles formed by the slow axis of the retardation film and the alignment direction of the liquid crystal alignment film or the angle between the slow axis and the alignment direction measured along the twisting direction of the twist orientation mode in the alignment direction of the liquid crystal alignment film may also satisfy Equation 2 below.

$$0.16 \times \Delta n d \times T/\mu m - 10 \leq A \leq 0.16 \times \Delta n d \times T/\mu m + 20 \quad [\text{Equation 2}]$$

In Equation 2, A is the smallest angle among the angles formed by the alignment direction of the liquid crystal alignment film or the angle between the slow axis and the alignment direction measured along the twisting direction of the twist orientation mode in the alignment direction of the liquid crystal alignment film (unit: degree), $\Delta n$ is the refractive index anisotropy of the variable layer (active liquid crystal layer) for light having a wavelength of 550 nm, d is the thickness (unit: μm) of the liquid crystal layer, and T is the twist angle (unit: degree) of the twist orientation mode.

The method of confirming the twisting direction and the twist angle of the twist orientation mode for confirming whether or not the equation is satisfied is as described above.

When Equation 2 is satisfied, the product ($\Delta n d$) of the refractive index anisotropy ($\Delta n$) of the liquid crystal layer for light having a wavelength of 550 nm and the thickness (d) of the liquid crystal layer may be more than 0.7 μm. In another example, the product ($\Delta n d$) of the refractive index anisotropy ($\Delta n$) and the thickness (d) of the liquid crystal layer may be about 2 μm or less, 1.5 μm or less, or about 1 μm or less.

Also, in another example, the angle A in Equation 2 above may be ($0.16 \times \Delta n d \times T/\mu m - 8$) or more, ($0.16 \times \Delta n d \times T/\mu m - 6$) or more, ($0.16 \times \Delta n d \times T/\mu m - 4$) or more, ($0.16 \times \Delta n d \times T/\mu m - 2$) or more, ($0.16 \times \Delta n d \times T/\mu m$) or more, ($0.16 \times \Delta n d \times T/\mu m + 2$) or more, ($0.16 \times \Delta n d \times T/\mu m + 4$) or more, or ($0.16 \times \Delta n d \times T/\mu m + 6$) or more.

In addition, the angle A in Equation 2 above may also be ($0.16 \times \Delta n d \times T/\mu m + 18$) or less, ($0.16 \times \Delta n d \times T/\mu m + 16$) or less, ($0.16 \times \Delta n d \times T/\mu m + 14$)) or less, ($0.16 \times \Delta n d \times T/\mu m + 12$) or less, (0.16×Δnd×T/μm+10) or less, (0.16×Δnd×T/μm+8) or less, (0.16×Δnd×T/μm+6) or less, (0.16×Δnd×T/μm+4) or less, (0.16×Δnd×T/μm+2) or less, or (0.16×Δnd×T/μm) or less or so.

In another example, when the twist angle in the twist orientation mode of the variable layer is 180 degrees or more or more than 180 degrees, the smallest angle among the angles formed by the slow axis of the retardation film and the alignment direction of the liquid crystal alignment film or the angle between the slow axis and the alignment direction measured along the twisting direction of the twist orientation mode in the alignment direction of the liquid crystal alignment film may satisfy Equation 3 below, or the largest angle among the angles formed by the slow axis of the retardation film and the alignment direction of the liquid crystal alignment film or the angle between the slow axis and the alignment direction measured along the reverse direction of the twisting direction of the twist orientation mode in the alignment direction of the liquid crystal alignment film may satisfy Equation 4 below.

$$A = (42 \pm 5) + (17 \pm 5) \times \sin(2\Delta n \times d \times f) \quad \text{[Equation 3]}$$

$$A = (132 \pm 5) + (17 \pm 5) \times \sin(2\Delta n \times d \times f) \quad \text{[Equation 4]}$$

In Equations 3 and 4, Δn is the refractive index anisotropy of the liquid crystal layer for light having a wavelength of 550 nm, d is the thickness (unit: μm) of the liquid crystal layer, and f is the twist angle of the twist orientation mode (unit: degree).

Furthermore, A in Equation 3 is the smallest angle among the angles formed by the slow axis of the retardation film and the alignment direction of the liquid crystal alignment film or the angle between the slow axis and the alignment direction measured along the twisting direction of the twist orientation mode in the alignment direction of the liquid crystal alignment film (unit: degree), and A in Equation 4 is the largest angle among the angles formed by the slow axis of the retardation film and the alignment direction of the liquid crystal alignment film or the angle between the slow axis and the alignment direction measured along the reverse direction of the twisting direction of the twist orientation mode in the alignment direction of the liquid crystal alignment film (unit: degree).

The method of confirming the twisting direction and the twist angle of the twist orientation mode for confirming whether or not the equation is satisfied is as described above.

When Equation 3 or 4 is satisfied, the twist angle may be about 600 degrees or less, 550 degrees or less, 500 degrees or less, 450 degrees or less, 400 degrees or less, 350 degrees or less, 300 degrees or less, 250 degrees or less, or 200 degrees or less or so.

When Equation 3 or 4 is satisfied, the product (Δnd) of the refractive index anisotropy (Δn) of the liquid crystal layer for light having a wavelength of 550 nm and the thickness (d) of the liquid crystal layer is When Equation 1 is satisfied, the product (Δnd) of the refractive index anisotropy (Δn) of the liquid crystal layer for light having a wavelength of 550 nm and the thickness (d) of the liquid crystal layer may be in a range of 0.2 μm to 2 μm. In another example, the product (Δnd) of the refractive index anisotropy (Δn) and the thickness (d) of the liquid crystal layer may be about 0.25 μm or more, 0.3 μm or more, 0.35 μm or more, 0.4 μm or more, or 0.45 μm or more, or may be about 1.5 μm or less, or about 1 μm or less or so.

Also, in another example, the angle A in Equation 3 may be (42±4)+(17±4)×sin(2Δn×d×f), (42±3)+(17±3)×sin(2Δn× d×f), (42±2)+(17±2)×sin(2Δn×d×f), (42±1)+(17±1)×sin (2Δn×d×f) or (42±17×sin(2Δn×d×f)), and in another example, the angle A in Equation 4 may be (132±4)+ (17±4)×sin(2Δn×d×f), (132±3)+(17±3)×sin(2Δn×d×f), (132±2)+(17±2)×sin(2Δn×d×f), (132±1)+(17±1)×sin(2Δn× d×f) or (132±17×sin(2Δn×d×f)).

By arranging the retardation film having high optical anisotropy described above in the above positional relationship, it is possible to provide a device without rainbow phenomenon, mirroring phenomenon and crosstalk phenomenon while having excellent transmittance-variable characteristics.

The refractive index anisotropy (Δn) applied to the above-mentioned equations is measured using an Abbe refractometer according to the method disclosed in Examples, as described above, and the method of measuring the thickness (d) of the liquid crystal layer, that is, the cell gap is also according to the method disclosed in Examples.

As long as the transmittance-variable device of the present application comprises the transmittance-variable layer and the retardation film, and the arrangement therebetween is controlled as mentioned above, it may be configured in various ways.

For example, basically, the transmittance-variable layer, in particular, the active liquid crystal layer is positioned between two substrates disposed opposite to each other, where any one of the two substrates may also be formed of the above-described retardation film in order to implement the device of the present application (first method).

Alternatively, the device of the present application may also be implemented by a method of attaching the retardation film to the outside of an element comprising a transmittance-variable layer positioned between two substrates disposed opposite to each other (second method).

Figure 3:
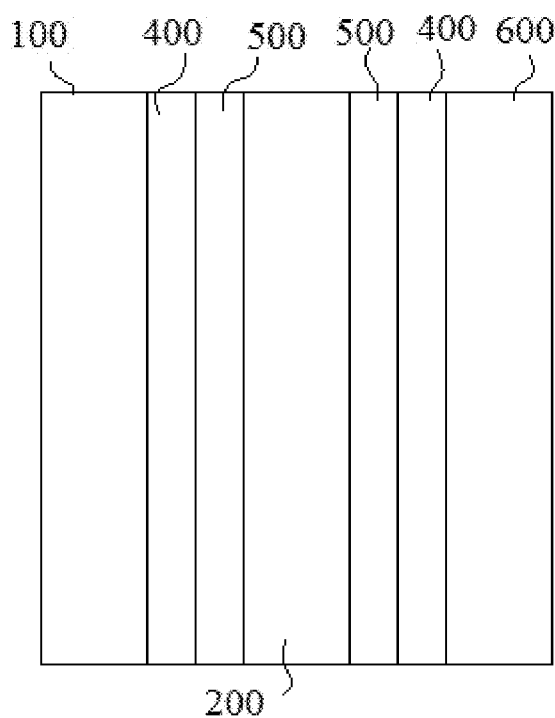

FIG. 3 is an example of implementing a device according to the first method, and such a device may comprise the retardation film (100), the electrode layer (400), the alignment film (300), the active liquid crystal layer (200), and the alignment film (500), the electrode layer (400) and the substrate (600) which are disposed sequentially.

Figure 4:
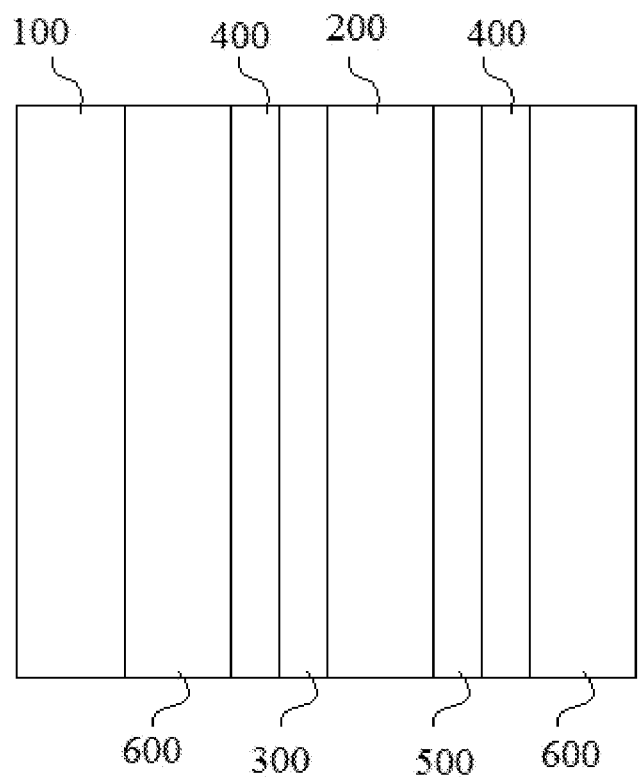

In addition, FIG. 4 is an example of implementing a device according to the second method, and such a device may comprise the retardation film (100), the substrate (600), the electrode layer (400), the alignment film (300), the active liquid crystal layer (200), the alignment film (500), the electrode layer (400) and the substrate (600) which are disposed sequentially.

That is, when the device is implemented in the first method, the retardation film is applied as the substrate, where the above-described liquid crystal alignment film may be formed on the surface of the retardation film, and when the device is implemented in the second method, the device further comprises the substrate that the liquid crystal alignment film is formed on the surface thereof, where the retardation film may be attached to the surface on which the liquid crystal alignment film of the substrate is not formed.

The electrode layer (400), which may be included in the device, is a component for applying power to the active liquid crystal layer (200) as an external signal, and as such an electrode layer, a known transparent electrode layer may be applied. For example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

As the liquid crystal alignment film included in the device, a known rubbing alignment film or a photo-alignment film, and the like may be applied, as described above, and the type of alignment film that may be applied according to a desired mode is known.

The kind of substrate (reference numeral 600 in FIGS. 3 and 4) that can be applied in the device is not particularly limited. As the substrate, the aforementioned retardation film itself may also be applied as the polymer film substrate, or other known substrates may also be applied.

For example, as the substrate, a glass film, a crystalline or amorphous silicon film, an inorganic film such as quartz or ITO (indium tin oxide) film or a plastic film, and the like can be used. As the plastic substrate, a substrate comprising TAC (triacetyl cellulose); a COP (cyclo olefin copolymer) such as a norbornene derivative; PMMA (poly(methyl methacrylate); PC (polycarbonate); PE (polyethylene); PP (polypropylene); PVA (poly(vinyl alcohol)); DAC (diacetyl cellulose); Pac (polyacrylate); PES (poly ether sulfone); PEEK (polyetheretherketon); PPS (polyphenylsulfone), PEI (polyetherimide); PEN (polyethylenenaphthalate); PET (polyethyleneterephtalate); PI (polyimide); PSF (polysulfone); PAR (polyarylate) or an amorphous fluorine resin, and the like can be used, without being limited thereto.

The device basically comprises the retardation film, the liquid crystal alignment film and the transmittance-variable layer as described above, which may also further comprise various known configurations as long as their positional relationship and the like are set as mentioned above.

For example, although not shown in the drawings, it may comprise a known component, for example, a spacer or a sealant, and the like for maintaining the distance between substrates in addition to the substrate, the transmittance-variable layer, and the like.

Also, it may further comprise, as other components, known components such as a pressure-sensitive adhesive or an adhesive applied as a use for attaching the retardation film to the substrate or other uses, a hard coating layer, an antireflection layer and a layer including a dye having a NIR (near-infrared) cut function. In addition, if necessary, the device may or may not comprise a passive polarizing layer, for example, a passive polarizing layer such as a PVA (poly(vinyl alcohol)) series polarizing layer.

Such transmittance-variable devices can be applied to various applications. The applications to which the transmittance-variable device can be applied can be exemplified by openings in closed spaces including buildings, containers or vehicles, and the like, such as windows or sunroofs, eyewear, windows and the like, and light blocking panels of OLEDs (organic light emitting devices), and the like. Here, in the range of eyewear, all eyewear formed so that an observer can observe the outside through lenses, such as general glasses, sunglasses, sports goggles or helmets, or a wearable device such as an instrument for experiencing virtual reality or augmented reality can be included.

A typical application to which the transmittance-variable device of the present application can be applied is eyewear. Recently, for sunglasses, sports goggles, instruments for experiencing augmented reality, and the like, the eyewear in which a lens is mounted so as to be inclined with an observer's front visual line is commercially available. The transmittance-variable device of the present application can also be effectively applied to the above-described eyewear.

When the transmittance-variable device of the present application is applied to eyewear, the structure of the eyewear is not particularly limited. That is, the transmittance-variable device may be mounted and applied in a lens for a left eye and/or a right eye having a known eyewear structure.

For example, the eyewear may comprise a left eye lens and a right eye lens; and a frame for supporting the left eye lens and the right eye lens.

Figure 5:
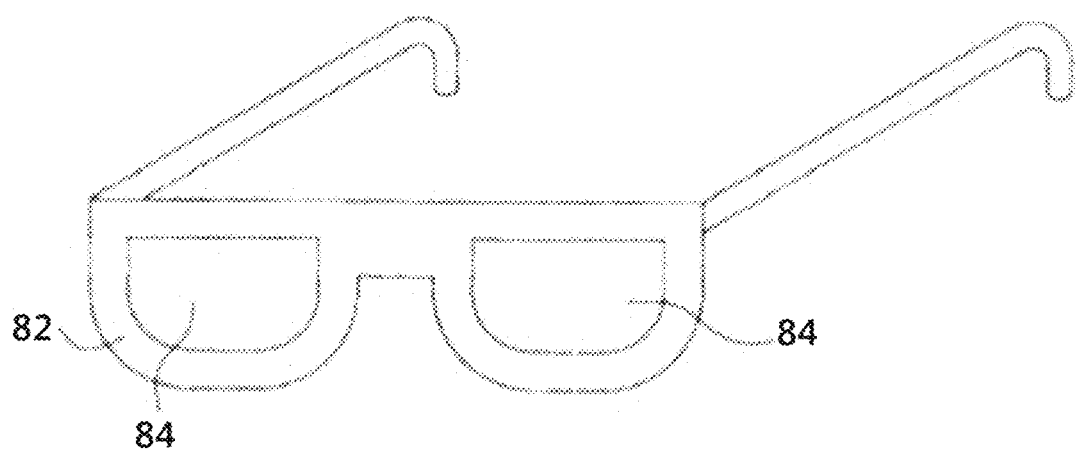
FIG. 5 exemplarily shows eyewear.

FIG. 5 is an exemplary schematic diagram of the eyewear, which is a schematic diagram of the eyewear comprising the frame (82), and left eye and right eye lenses (84), but the structure of the eyewear to which the transmittance-variable device of the present application can be applied is not limited to FIG. 5.

In the eyewear, the left eye lens and the right eye lens may each comprise the transmittance-variable device. Such a lens may comprise only the transmittance-variable device, or may also comprise other configurations.

Other configurations and designs of the eyewear are not particularly limited, and known methods can be applied.

Advantageous Effects

The present application can provide a transmittance-variable device, which can be applied to various applications without causing problems such as a crosstalk phenomenon, a rainbow phenomenon or a mirroring phenomenon, while having excellent transmittance-variable characteristics.

MODE FOR INVENTION

Hereinafter, the present application will be specifically described by way of Examples, but the scope of the present application is not limited by the following examples.

1. Phase Difference Evaluation of Polymer Film

The in-plane retardation value (Rin) of the polymer film was measured for light having a wavelength of 550 nm using a UV/VIS spectroscope 8453 instrument from Agilent Co., Ltd. Two sheets of polarizers were installed in the UV/VIS spectroscope so that their transmission axes were orthogonal to each other, and a polymer film was installed between the two sheets of polarizers so that its slow axis formed 45 degrees with the transmission axes of the two polarizers, respectively, and then the transmittance according to wavelengths was measured. The phase retardation order of each peak is obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$$T=\sin^2[(2\pi R/\lambda)] \qquad \text{[Equation A]}$$

$$T=\sin^2[((2n+1)\pi/2)] \qquad \text{[Equation B]}$$

$$n=(\lambda n-3\lambda n+1)/(2\lambda n+1-2\lambda n) \qquad \text{[Equation C]}$$

In the above, R denotes in-plane retardation (Rin), λ denotes a wavelength, and n denotes a nodal degree of a sine waveform.

2. Thickness Evaluation of Transmittance-Variable Layer (Liquid Crystal Layer)

Figure 6:
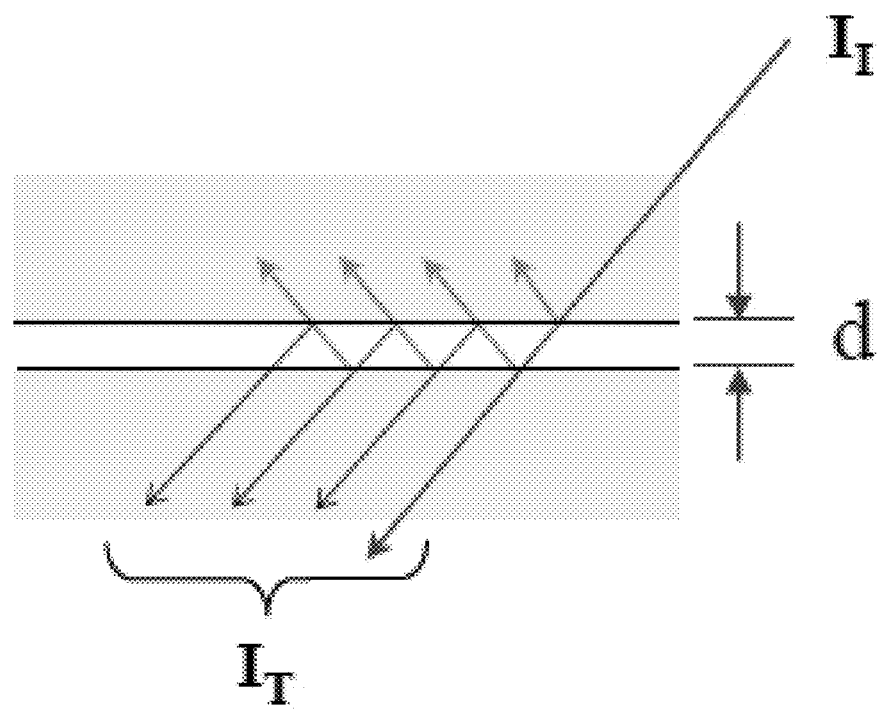
FIG. 6 is a diagram schematically showing a method of confirming a thickness of a transmittance-variable layer.
Figure 7:
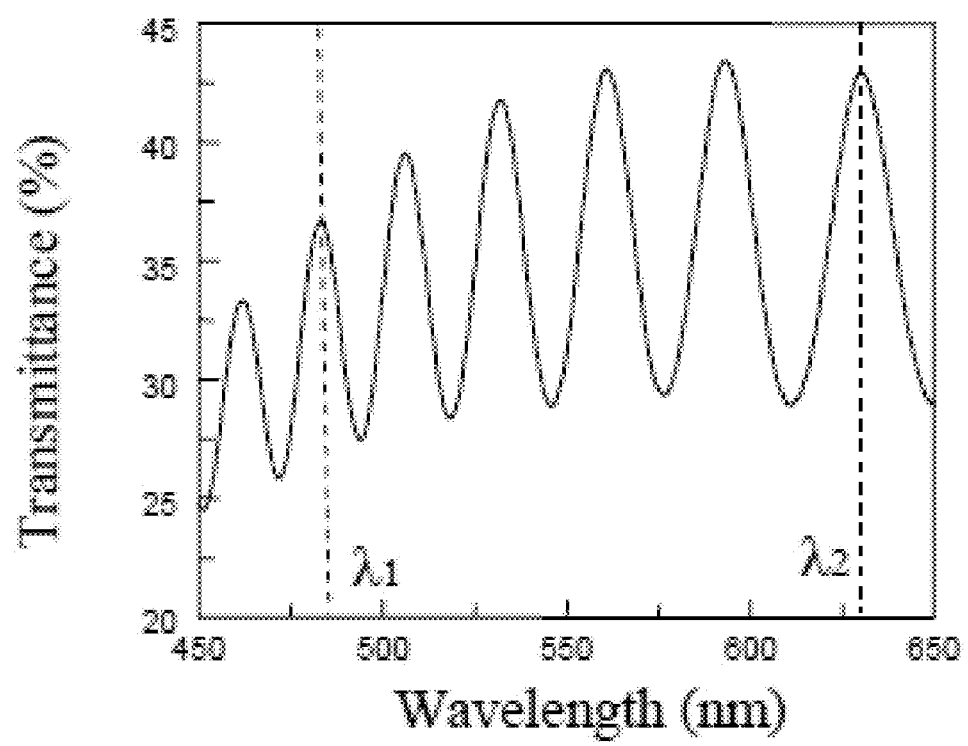
FIG. 7 is a transmittance graph obtained in a process of confirming a thickness of a transmittance-variable layer.

A thickness of a transmittance-variable layer, that is, a cell gap was measured in the following manner using a spectrometer. As shown in FIG. 6, one surface of a transmittance-variable layer having a cell gap d is irradiated with light ($I_I$), and the light ($I_T$) transmitted from the other surface is measured. Upon irradiation of the light, the irradiation angle is parallel to the imaginary surface normal direction of the transmittance-variable layer. By checking the transmittance for each wavelength in this manner, a transmittance graph as shown in FIG. 7 may be obtained by constructive interference. The graph obtained as shown in FIG. 7 has a relationship of Equation E below with the cell gap (d), which is the thickness of the transmittance-variable layer, wherein κ in Equation E below is the number of peaks present between wavelengths $\lambda_1$ and $\lambda_2$ in FIG. 7. That is, from the graph obtained as shown in FIG. 7, the number of peaks between wavelengths $\lambda_1$ and $\lambda_2$, which is the κ, can be obtained, and the cell gap (d) can be obtained by substituting the wavelengths $\lambda_1$ and $\lambda_2$ into Equation E.

$$d = \frac{\kappa}{2(1/\lambda 1 - 1/\lambda 2)} \quad \text{[Equation E]}$$

3. Refractive Index Anisotropy Evaluation of Transmittance-Variable Layer (Liquid Crystal Layer)

Figure 8:
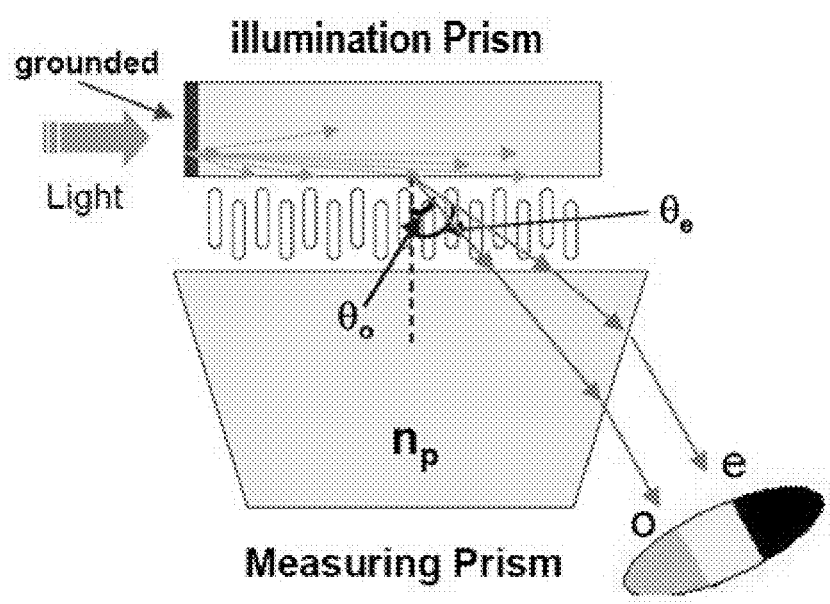
FIG. 8 is a diagram schematically showing a process of evaluating refractive index anisotropy.

Refractive index anisotropy (Δn) of a transmittance-variable layer is evaluated in the following manner using an Abbe refractometer. By coating a vertical alignment film on the measuring prism and illumination prism surfaces of the Abbe refractometer and coating a liquid crystal compound to be measured on the measuring prism and then covering it with the illumination prism, the liquid crystal compound is vertically oriented by the vertical orientation force of the two interfaces. The liquid crystal compound applied in the above process is only the liquid crystal compound, which is applied to the transmittance-variable layer, without mixing with other materials such as dichroic dye. Then, as shown in FIG. 8, when a linear polarizer is applied to the eyepiece side and irradiated with light to be observed, θe and θo as shown in FIG. 8 can be obtained and the extraordinary refractive index ($n_e = n_p \sin \theta e$) and the ordinary refractive index ($n_o = n_p \sin \theta o$) can be obtained through the refractive index ($n_p$) of the measuring prism and the angles (θe and θo), where the difference ($n_e - n_o$) may be defined as the refractive index anisotropy. The reference wavelength upon measurement is approximately 550 nm.

Example 1

A device was manufactured using a highly stretched PET (polyethylene terephthalate) film substrate (SRF substrate, thickness: 80 μm, manufacturer: Toyobo, product name: TA044) from Toyobo as s a polymer film substrate. An ITO (indium tin oxide) film (electrode layer) was first deposited on one surface of the SRF substrate, and an alignment film was formed. The applied SRF substrate has in-plane retardation of approximately 11,000 nm to 14,000 nm based on the wavelength of 550 nm after the ITO film is deposited. The alignment film was formed by rubbing a polyimide-based horizontal alignment film (SE-7492, Nissan) having a thickness of approximately 300 nm with a rubbing cloth, wherein the rubbing direction (alignment direction) and the slow axis direction of the SRF substrate were set to approximately 20 degrees clockwise (manufacture of the upper substrate, the viewer side substrate). The lower substrate was manufactured in the same manner. The upper substrate and the lower substrate were disposed so that the respective alignment films faced (cell gap: 8 μm), and sealed after injecting a liquid crystal material therein to manufacture the device.

Upon the arrangement, the upper substrate and the lower substrate were disposed so that their alignment directions were parallel to each other, but the rubbing directions were opposite to each other. In addition, as the liquid crystal material, a composition was used, in which a chiral dopant (S811, Merck) was blended at a concentration of about 0.56 weight % with a GHLC mixture containing a liquid crystal compound having positive dielectric constant anisotropy with refractive index anisotropy (Δn) of 0.084 and a dichroic dye (a mixture that a dichroic dye (JD 12, mixed dye of three dyes of cyan, magenta, and yellow colors on a British color synthesis solution) from LG Chem as the dichroic dye was blended at a concentration of approximately 1.8 weight % with SLC157013 (Slichem)). The obtained transmittance-variable layer (liquid crystal layer) is a twisted mode liquid crystal layer having a twisted angle of approximately 180 degrees, and the angle between the slow axis of the upper substrate (SRF substrate) and the alignment direction of the liquid crystal alignment film measured along the twisting direction of the twist mode is approximately 20 degrees.

Example 2

A device was manufactured using a highly stretched PET (polyethylene terephthalate) film substrate (SRF substrate, thickness: 80 μm, manufacturer: Toyobo, product name: TA044) from Toyobo as s a polymer film substrate. An ITO (indium tin oxide) film (electrode layer) was first deposited on one surface of the SRF substrate, and an alignment film was formed. The applied SRF substrate has in-plane retardation of approximately 11,000 nm to 14,000 nm based on the wavelength of 550 nm after the ITO film is deposited. The alignment film was formed by rubbing a polyimide-based horizontal alignment film (SE-7492, Nissan) having a thickness of approximately 300 nm with a rubbing cloth, wherein the rubbing direction (alignment direction) and the slow axis direction of the SRF substrate were set to approximately 23 degrees clockwise (manufacture of the upper substrate, the viewer side substrate). The lower substrate was manufactured in the same manner. The upper substrate and the lower substrate were disposed so that the respective alignment films faced (cell gap: 5.92 μm), and sealed after injecting a liquid crystal material therein to manufacture the device.

Upon the arrangement, the upper substrate and the lower substrate were disposed so that their alignment directions were parallel to each other, but the rubbing directions were opposite to each other. In addition, as the liquid crystal material, a composition was used, in which a chiral dopant (S811, Merck) was blended at a concentration of about 0.36 weight % with a GHLC mixture containing a liquid crystal compound having positive dielectric constant anisotropy with refractive index anisotropy (Δn) of 0.076 and a dichroic dye (a mixture that a dichroic dye (JD 12, mixed dye of three dyes of cyan, magenta, and yellow colors on a British color synthesis solution) from LG Chem as the dichroic dye was blended at a concentration of approximately 1.8 weight % with SHN-5011XX (JNC)). The obtained transmittance-variable layer (liquid crystal layer) is a twisted mode liquid crystal layer having a twisted angle of approximately 60 degrees, and the angle between the slow axis of the upper substrate (SRF substrate) and the alignment direction of the liquid crystal alignment film measured along the twisting direction of the twist mode is approximately 23 degrees.

Comparative Example 1

A device was manufactured in the same manner as in Example 1, except that a PC (polycarbonate) film substrate (PC substrate, thickness: 100 µm, manufacturer: Teijin, product name: PFC100-D150), which was an isotropic film substrate, was applied as a polymer film substrate. In this case, since the applied film substrate is an isotropic film substrate, the relationship between the alignment direction of the alignment film and the slow axis of the substrate is not considered.

Comparative Example 2

A device was manufactured in the same manner as in Example 2, except that a PC (polycarbonate) film substrate (PC substrate, thickness: 100 µm, manufacturer: Teijin, product name: PFC100-D150), which was an isotropic film substrate, was applied as a polymer film substrate. In this case, since the applied film substrate is an isotropic film substrate, the relationship between the alignment direction of the alignment film and the slow axis of the substrate is not considered.

Test Example 1

Figure 9:
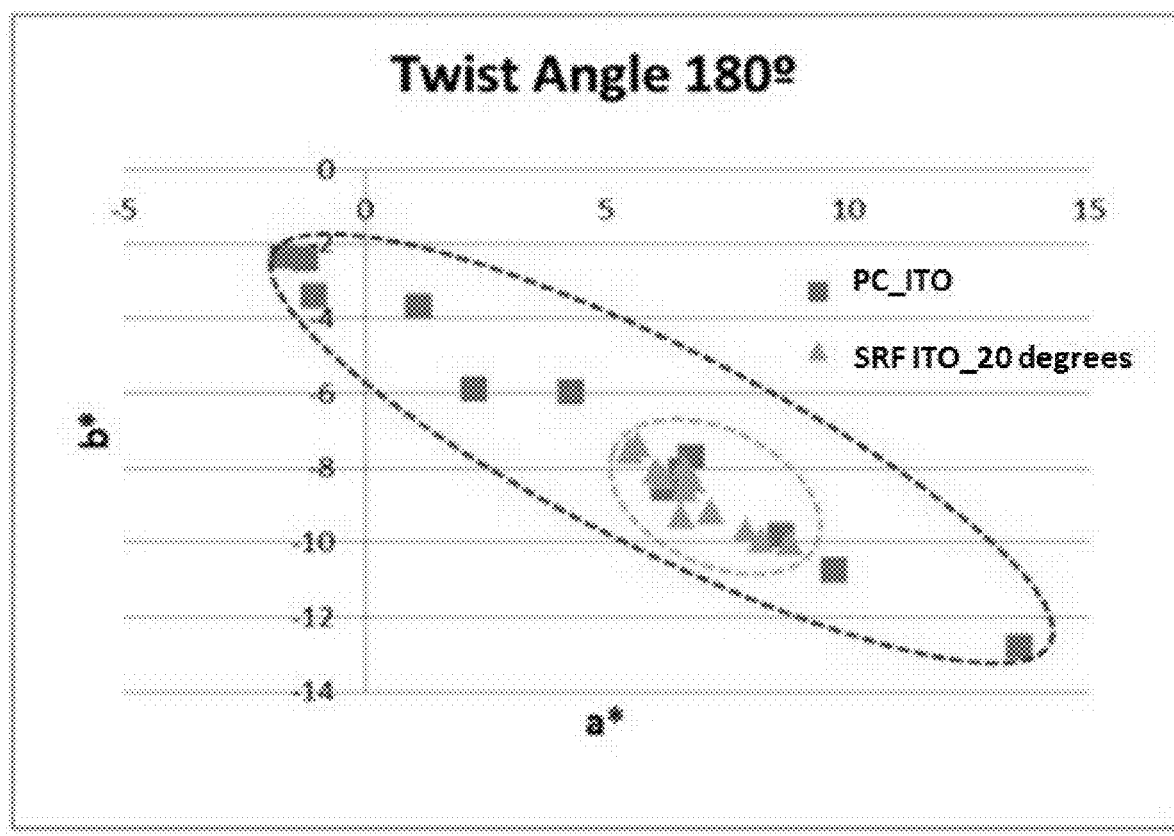
FIGS. 9 to 11 are results of comparing performance of Examples and Comparative Examples.
Figure 10:
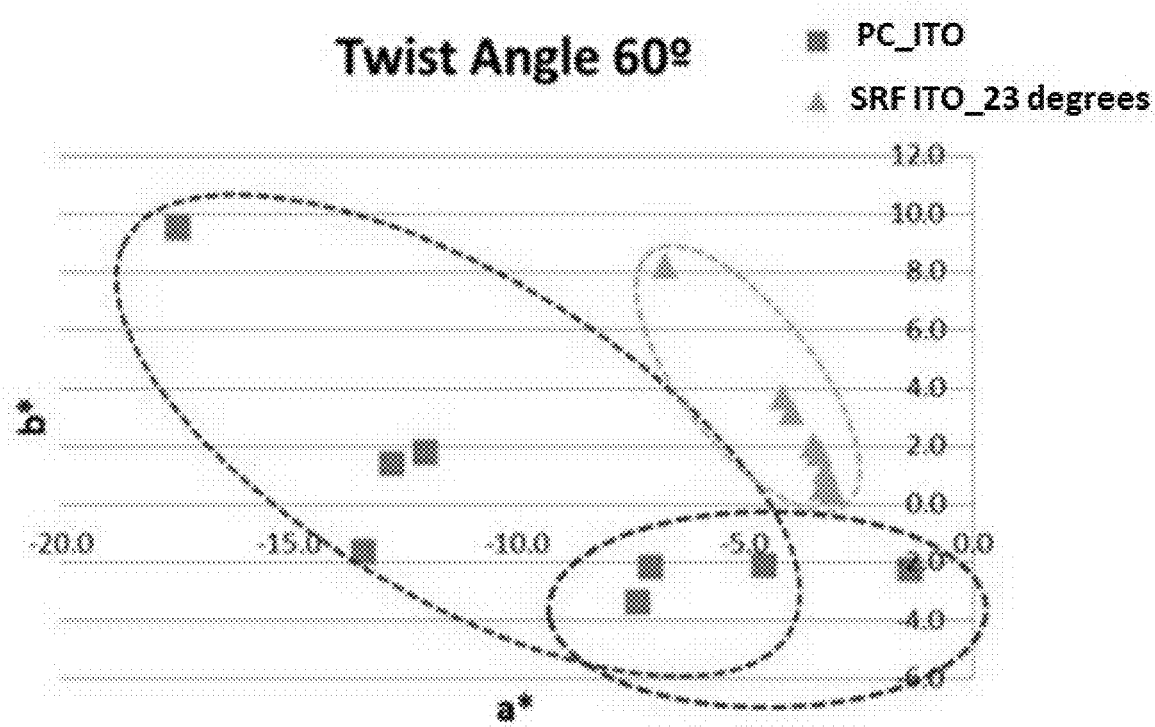

An absorbing linear PVA (polyvinyl alcohol) polarizer was disposed on the upper SRF substrate or PC substrate surfaces of the devices manufactured in Examples and Comparative Examples, respectively, and the change in color coordinates (CIE La*b*) of the emitted light was measured while rotating the absorption axis of the polarizer in a range of 0 degrees to 360 degrees. FIG. 9 is the measurement results as above, which is a comparison view of Example 1 and Comparative Example 1, and FIG. 10 is a comparison view of Example 2 and Comparative Example 2. In FIG. 9, SRF ITO_20 DEGREE is Example 1, and PC_ITO is Comparative Example 1, and in FIG. 10, SRF ITO_23 DEGREE is Example 2 and PC_ITO is Comparative Example 2. It can be confirmed from the drawing that the change in color coordinates (a*-b* color coordinate) is significantly less in the cases of Examples 1 and 2 than in the cases of Comparative Examples 1 and 2.

Example 3

A device was manufactured using a highly stretched PET (polyethylene terephthalate) film substrate (SRF substrate, thickness: 80 µm, manufacturer: Toyobo, product name: TA044) from Toyobo as s a polymer film substrate. An ITO (indium tin oxide) film (electrode layer) was first deposited on one surface of the SRF substrate, and an alignment film was formed. The applied SRF substrate has in-plane retardation of approximately 11,000 nm to 14,000 nm based on the wavelength of 550 nm after the ITO film is deposited. The alignment film was formed by rubbing a polyimide-based horizontal alignment film (SE-7492, Nissan) having a thickness of approximately 300 nm with a rubbing cloth, wherein the rubbing direction (alignment direction) and the slow axis direction of the SRF substrate were set to approximately 12 degrees clockwise (manufacture of the upper substrate, the viewer side substrate). The lower substrate was manufactured in the same manner. The upper substrate and the lower substrate were disposed so that the respective alignment films faced (cell gap: 6 µm), and sealed after injecting a liquid crystal material therein to manufacture the device.

Upon the arrangement, the upper substrate and the lower substrate were disposed so that their alignment directions were parallel to each other, but the rubbing directions were opposite to each other. In addition, as the liquid crystal material, a composition was used, in which a chiral dopant (S811, Merck) was blended at a concentration of about 0.38 weight % with a GHLC mixture (MDA-16-1235, Merck) containing a liquid crystal compound having positive dielectric constant anisotropy with refractive index anisotropy (Δn) of 0.13 and a dichroic dye. The obtained transmittance-variable layer (liquid crystal layer) is a twisted mode liquid crystal layer having a twisted angle of approximately 90 degrees, and the angle between the slow axis of the upper substrate (SRF substrate) and the alignment direction of the liquid crystal alignment film measured along the twisting direction of the twist mode is approximately 12 degrees.

Comparative Example 3

A device was manufactured in the same manner as in Example 3, except that a PC (polycarbonate) film substrate (PC substrate, thickness: 100 µm, manufacturer: Teijin, product name: PFC100-D150), which was an isotropic film substrate, was applied as a polymer film substrate. In this case, since the applied film substrate is an isotropic film substrate, the relationship between the alignment direction of the alignment film and the slow axis of the substrate is not considered.

Test Example 2

Figure 11:
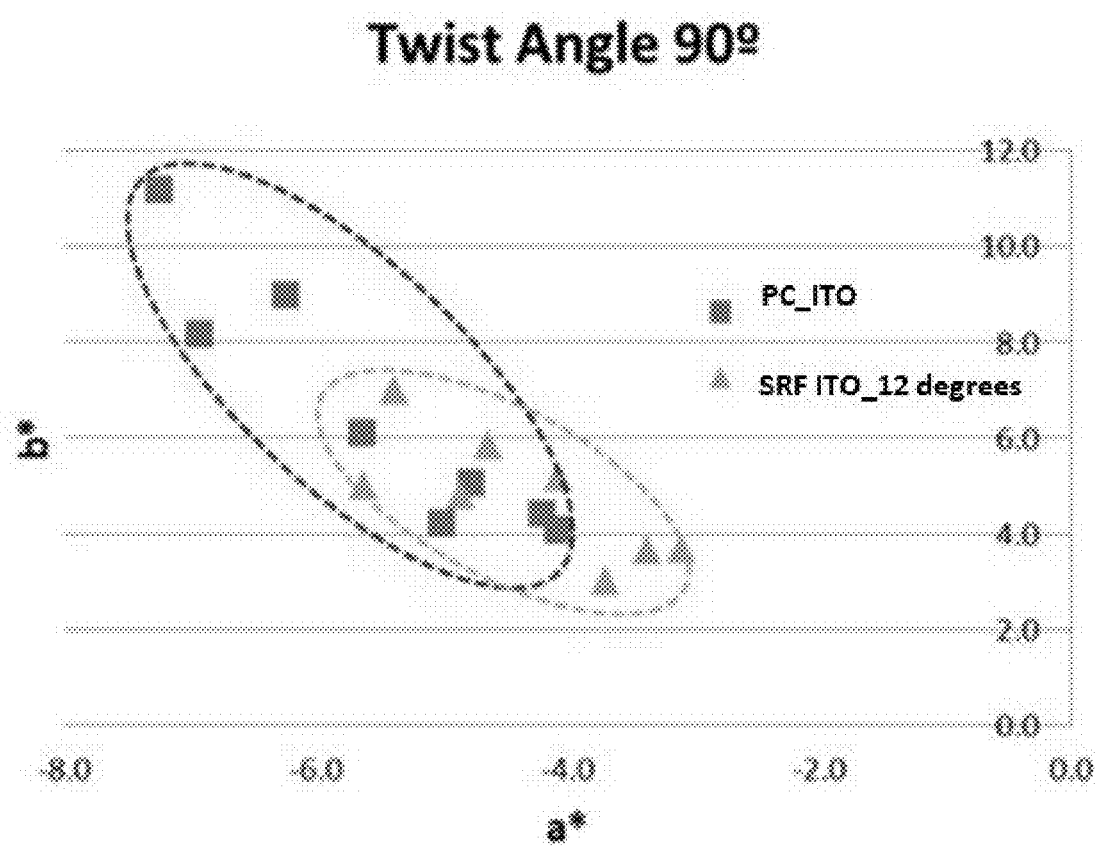

An absorbing linear PVA (polyvinyl alcohol) polarizer was disposed on the upper SRF substrate or PC substrate surfaces of the devices manufactured in Examples and Comparative Examples, respectively, and the change in color coordinates (CIE La*b*) of the emitted light was measured while rotating the absorption axis of the polarizer in a range of 0 degrees to 360 degrees. FIG. 11 is the measurement results as above, which is a comparison view of Example 3 and Comparative Example 3 In FIG. 11, SRF ITO_12 DEGREE is Example 3, and PC_ITO is Comparative Example 3. It can be confirmed from the drawing that the change in color coordinates (a*-b* color coordinate) is significantly less in the case of Example 3 than in the case of Comparative Example 3.

Example 4

Figure 12:
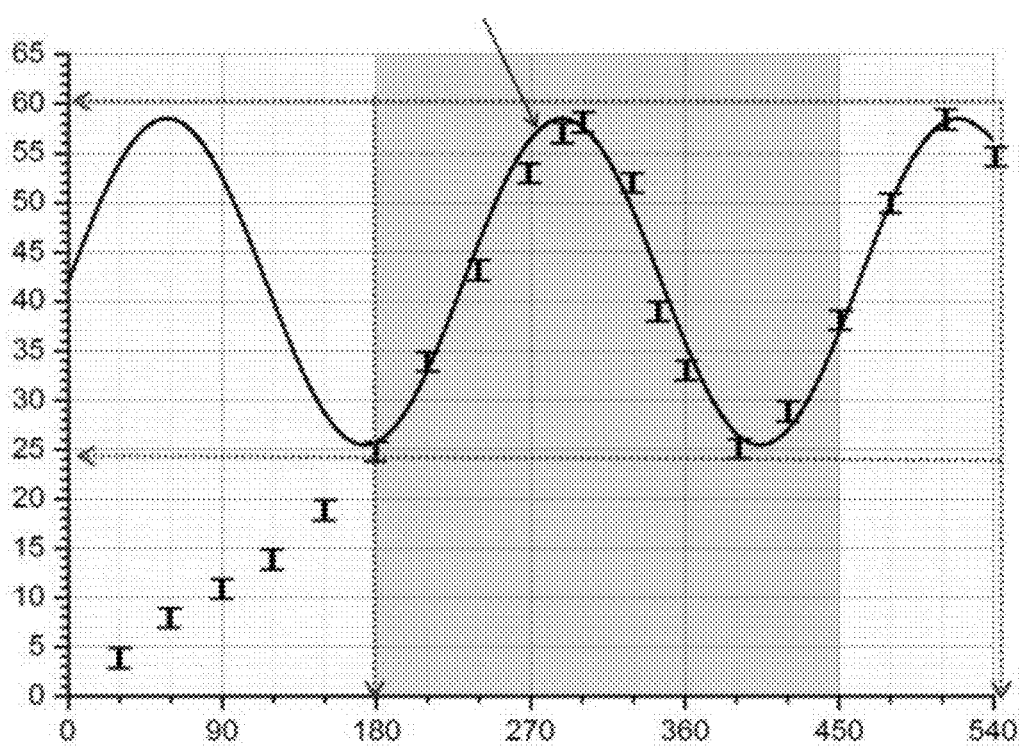
FIGS. 12 to 14 are views showing a change in color coordinate characteristics according to twist angles of devices of Examples.

FIG. 12 is a view showing the results in the case where the device is manufactured in the same manner as in Example 3, but as the liquid crystal material, a liquid crystal material is used, in which a chiral dopant (S811, Merck) is blended with a GHLC mixture (MDA-16-1235, Merck) including a liquid crystal compound having positive dielectric constant anisotropy with refractive index anisotropy (Δn) of 0.13 and the dichroic dye, and the liquid crystal layer has a thickness, that is, a cell gap of 6 µm. In the drawing, the X axis is the twist angle (T) of the device, and the Y axis is the slow axis angle of the SRF substrate that shows the minimum change in color coordinates when the change in color coordinates has been measured in the same manner as in Test Example 2 at the relevant twist angle (T). The slow axis angle of the SRF substrate is the angle between the slow axis of the upper substrate (SRF substrate) and the alignment direction of the liquid crystal alignment film formed on the upper substrate, which can be adjusted by controlling the alignment direction of the alignment film upon manufacturing the device in the manner as shown in Example 3. In addition, the twist angle (X axis) can be controlled through the added amount of the chiral dopant. The vertical scatter bar shown in the drawing shows the optimal slow axis angles. It can be seen from the drawing that when the twist angle is 180 degrees or less, the optimum angle is according to Equation 1 below.

$$0.16 \times \Delta n \times T / \mu m - 10 \leq A \leq 0.16 \times \Delta n \times T / \mu m + 20 \quad \text{[Equation 1]}$$

In Equation 1, Δn is the refractive index anisotropy of the liquid crystal layer for light having a wavelength of 550 nm, which is 0.13 in the case of Example 4, d is the thickness (unit: μm) of the liquid crystal layer, which is 6 μm in the case of Example 4, and T is the twist angle (unit: degree) in the twist orientation mode.

Example 5

Figure 13:
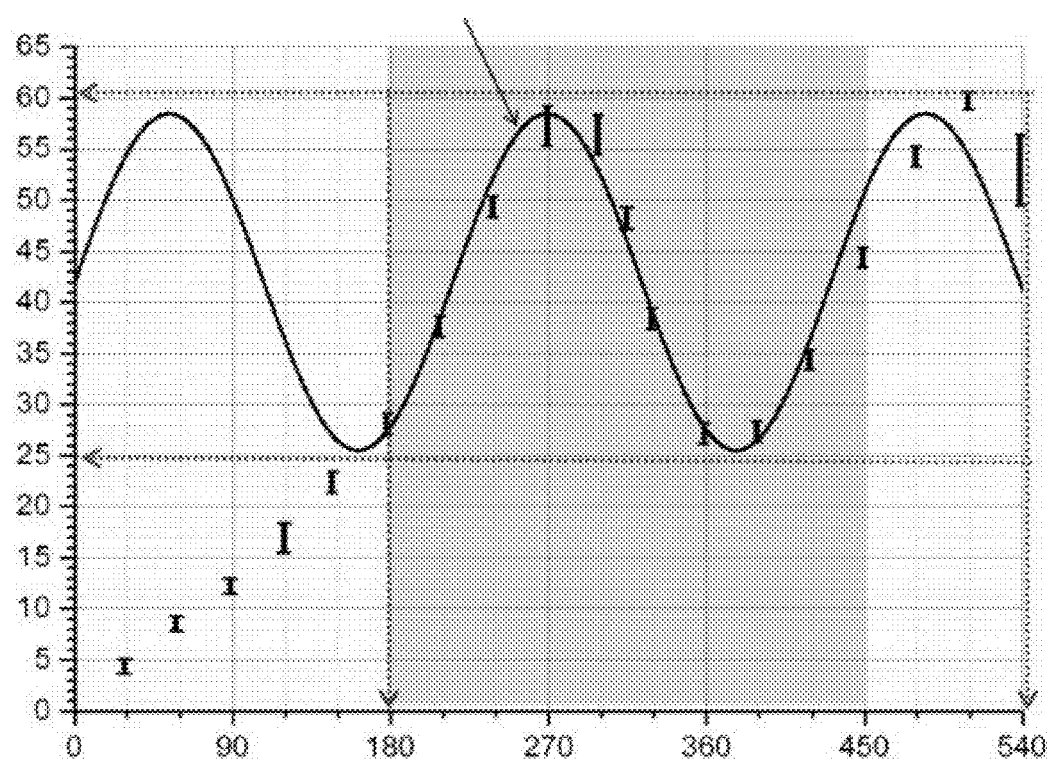

FIG. 13 is a view showing the results in the case where the device is manufactured in the same manner as in Example 3, but as the liquid crystal material, a liquid crystal material is used, in which a chiral dopant (S811, Merck) is blended with a liquid crystal compound having positive dielectric constant anisotropy with refractive index anisotropy (Δn) of 0.076 (a mixture that a dichroic dye (JD 12, mixed dye of three dyes of cyan, magenta, and yellow colors on a British color synthesis solution) from LG Chem as the dichroic dye was blended at a concentration of approximately 1.8 weight % with SHN-5011XX (JNC)), and the liquid crystal layer has a thickness, that is, a cell gap of 11 μm. In the drawing, the X axis is the twist angle (T) of the device, and the Y axis is the slow axis angle of the SRF substrate that shows the minimum change in color coordinates when the change in color coordinates has been measured in the same manner as in Test Example 2 at the relevant twist angle (T). The slow axis angle of the SRF substrate is the angle between the slow axis of the upper substrate (SRF substrate) and the alignment direction of the liquid crystal alignment film formed on the upper substrate, which can be adjusted by controlling the alignment direction of the alignment film upon manufacturing the device in the manner as shown in Example 3. In addition, the twist angle (X axis) can be controlled through the added amount of the chiral dopant. The vertical scatter bar shown in the drawing shows the optimal slow axis angles. It can be seen from the drawing that when the twist angle is 180 degrees or less, the optimum angle is according to Equation 1 of Example 4.

Example 6

Figure 14:
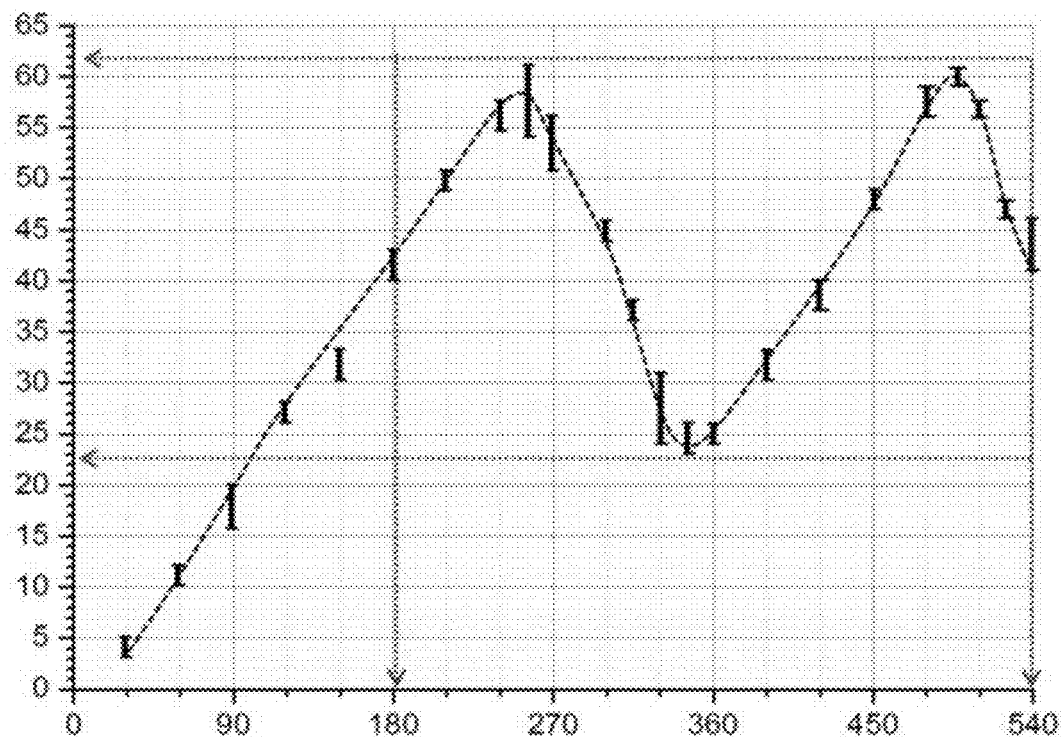

FIG. 14 is a view showing the results in the case where the device is manufactured in the same manner as in Example 3, but as the liquid crystal material, a liquid crystal material is used, in which a chiral dopant (S811, Merck) is blended with a liquid crystal compound having positive dielectric constant anisotropy with refractive index anisotropy (Δn) of 0.076 (a mixture that a dichroic dye (JD 12, mixed dye of three dyes of cyan, magenta, and yellow colors on a British color synthesis solution) from LG Chem as the dichroic dye was blended at a concentration of approximately 1.8 weight % with SHN-5011XX (JNC)), and the liquid crystal layer has a thickness, that is, a cell gap of 12 μm. In the drawing, the X axis is the twist angle (T) of the device, and the Y axis is the slow axis angle of the SRF substrate that shows the minimum change in color coordinates when the change in color coordinates has been measured in the same manner as in Test Example 2 at the relevant twist angle (T). The slow axis angle of the SRF substrate is the angle between the slow axis of the upper substrate (SRF substrate) and the alignment direction of the liquid crystal alignment film formed on the upper substrate, which can be adjusted by controlling the alignment direction of the alignment film upon manufacturing the device in the manner as shown in Example 3. In addition, the twist angle (X axis) can be controlled through the added amount of the chiral dopant. The vertical scatter bar shown in the drawing shows the optimal slow axis angles. It can be seen from the drawing that when the twist angle is 180 degrees or less, as the optimum angle is according to Equation 1 of Example 4.

The invention claimed is:

1. A transmittance-variable device, comprising:
   a retardation film having in-plane retardation of 5,000 nm or more for light having a wavelength of 550 nm;
   a liquid crystal alignment film; and
   a liquid crystal layer configured to implement a twist orientation mode,
   wherein the retardation film, the liquid crystal alignment film and the liquid crystal layer are sequentially arranged,
   wherein a twist angle (T) of the twist orientation mode is in a range of 50 degrees to 180 degrees, and
   wherein the smallest angle A among angles between a slow axis of the retardation film and an alignment direction of the liquid crystal alignment film satisfies the following Equation 1 when a product (Δnd) of a refractive index anisotropy (Δn) and a thickness (d) is 0.7 μm or less, wherein Δn is the refractive index anisotropy of the liquid crystal layer for light having a wavelength of 550 nm and the thickness (d) is the thickness of the liquid crystal layer, and
   wherein the smallest angle A among angles between a slow axis of the retardation film and an alignment direction of the liquid crystal alignment film satisfies the following Equation 2 when the product (Δnd) of (Δn) and the thickness (d) is more than 0.7 μm $$0.05 \times \Delta n \times T / \mu m + 10 \leq A \leq 0.16 \times \Delta n \times T / \mu m + 60 \quad \text{[Equation 1]}$$

wherein the thickness (d) is in units of micrometers (μm), and T is in units of degree $$0.16 \times \Delta n \times T / \mu m - 10 \leq A \leq 0.16 \times \Delta n \times T / \mu m + 20 \quad \text{[Equation 2]}$$

wherein, Δn, the thickness (d), and T are in the same units as in Equation 1.

2. The transmittance-variable device according to claim 1, wherein a ratio of the maximum transmittance (Tmax) relative to the minimum transmittance (Tmin) is in a range of 1.5 to 10.

3. The transmittance-variable device according to claim 1, wherein the angle A is an angle measured along a twisting direction of the twist orientation mode from the alignment direction of the liquid crystal alignment film.

4. The transmittance-variable device according to claim 3, wherein the twisting direction is clockwise or counterclockwise.

5. The transmittance-variable device according to claim 1, wherein the liquid crystal alignment film is formed on a surface of the retardation film.

6. The transmittance-variable device according to claim 1, further comprising:
- a substrate, wherein the liquid crystal alignment film is formed on a surface of the substrate, and wherein the retardation film is attached to a surface of the substrate on which the liquid crystal alignment film is not formed.

7. The transmittance-variable device according to claim 1, wherein the twist orientation mode is a horizontal twist orientation mode or an oblique twist orientation mode.

8. The transmittance-variable device according to claim 1, wherein the liquid crystal layer comprises a dichroic dye.

9. The transmittance-variable device according to claim 1, wherein the liquid crystal layer comprises a chiral agent.

10. The transmittance-variable device according to claim 1, wherein the liquid crystal layer has a thickness of 20 μm or less.

11. Eyewear, comprising:
- a left eye lens and a right eye lens; and
- a frame configured to support the left eye lens and the right eye lens,
- wherein each of the left eye lens and the right eye lens comprises the transmittance-variable device of claim 1.

* * * * *